(12) United States Patent  (10) Patent No.: US 7,725,019 B2
Sugimoto  (45) Date of Patent: May 25, 2010

(54) APPARATUS AND METHOD FOR DECIDING IN-FOCUS POSITION OF IMAGING LENS

(75) Inventor: Masahiko Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1010 days.

(21) Appl. No.: 11/454,892

(22) Filed: Jun. 19, 2006

(65) Prior Publication Data

US 2006/0291845 A1    Dec. 28, 2006

(30) Foreign Application Priority Data

Jun. 22, 2005    (JP) .............................. 2005-181612

(51) Int. Cl.
G03B 17/00    (2006.01)
G03B 13/34    (2006.01)

(52) U.S. Cl. ........................................ 396/122; 396/77

(58) Field of Classification Search .................. 396/77, 396/79, 121, 122; 348/345, 348, 349
See application file for complete search history.

(56) References Cited

U.S. PATENT DOCUMENTS 5,032,023 A * 7/1991 Schneiter .................... 356/3.05
5,061,062 A * 10/1991 Schneiter .................... 356/3.05
5,082,362 A * 1/1992 Schneiter .................... 356/3.03
5,530,514 A * 6/1996 Lisson et al. ................. 396/114
6,240,253 B1 * 5/2001 Yamaguchi et al. ........... 396/61
2009/0001170 A1 * 1/2009 He .......................... 235/462.41

FOREIGN PATENT DOCUMENTS

JP    11-146405 A    5/1999

* cited by examiner

*Primary Examiner*—Rodney E Fuller
(74) *Attorney, Agent, or Firm*—Sughrue Mion, PLLC

(57) ABSTRACT

A subject is imaged while an imaging lens is moved along the optic axis in incremental distances, and a graph of focus evaluations representing degree of focus of the subject image is obtained. Processing for detecting a face is executed at positions of the imaging lens where the focus evaluation value is equal to or greater than a threshold value. If a face is detected from the image of the subject obtained at positions of the imaging lens, then this range of positions is set as a focusing range and the subject is imaged while the imaging lens is moved within this focusing range. A graph of face-area focus evaluations representing degree of focus of the face detected from among the obtained images of the subject is obtained and the position at which this graph is maximum is decided upon as the in-focus position of the imaging lens.

20 Claims, 17 Drawing Sheets

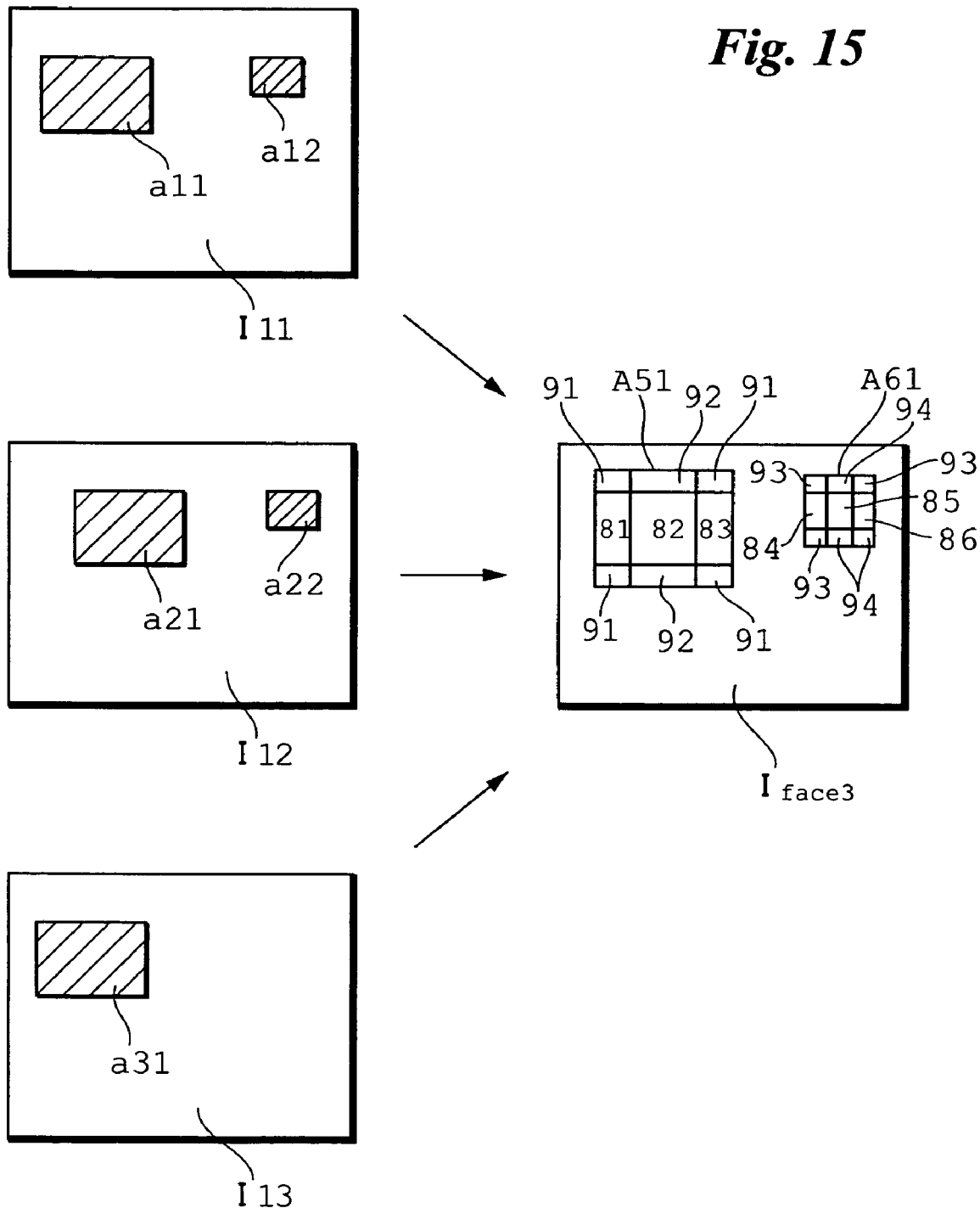

APPARATUS AND METHOD FOR DECIDING IN-FOCUS POSITION OF IMAGING LENS

BACKGROUND OF THE INVENTION

1. Field of the Invention

This invention relates to a method and apparatus for deciding the in-focus position of an imaging lens.

2. Description of the Related Art

In an example of the prior art (see the specification of Japanese Patent Application Laid-Open No. 11-146405), a skin-tone area contained in the image of a subject is detected and the skin-tone area detected is adopted as a focusing area.

Even in a case where a skin-tone area is detected, however, it is difficult to detect the skin-tone area accurately when the very subject image in which the skin tone is to be detected is extremely out of focus. Consequently, there are occasions where focusing cannot be achieved accurately even when a skin-tone area is adopted as a focusing area. Similarly, even in a case where a target is detected solely from contrast (density) information without using color information, it is difficult to detect the target accurately in an extremely out-of-focus state.

SUMMARY OF THE INVENTION

Accordingly, an object of the present invention is to achieve focusing comparatively accurately.

According to a first aspect of the present invention, the foregoing object is attained by providing an apparatus for deciding an in-focus position of an imaging lens, comprising: a solid-state electronic image sensing device for sensing the image of a subject and outputting image data representing the image of the subject; a first focusing data output device for moving an imaging lens, which has been placed in front of the solid-state electronic image sensing device, along the direction of the optic axis in increments of a first prescribed distance and outputting focusing data representing degree of focus of the image of the subject at every position to which the lens is moved; a target-image detecting device for detecting the image of a target, which is contained in the image of the subject represented by image data that is output from the solid-state electronic image sensing device at least at one position among positions of the imaging lens at which the level of the focusing data that has been output from the focusing data output device is equal to or greater than a prescribed threshold value, in increments of a second prescribed distance (at each position of the imaging lens) that is less than the first prescribed distance; and an in-focus position deciding device for deciding on the position of the imaging lens as the in-focus position based upon data that corresponds to the target detected by the target detecting device.

The first aspect of the present invention also provides a method suited to the above-described apparatus for deciding an in-focus position of an imaging lens. More specifically, there is provided a method of deciding an in-focus position of an imaging lens comprising the steps of: sensing the image of a subject using a solid-state electronic image sensing device and obtaining image data representing the image of the subject; moving an imaging lens, which has been placed in front of the solid-state electronic image sensing device, along the direction of the optic axis in increments of a first prescribed distance and obtaining focusing data representing degree of focus of the image of the subject at every position to which the lens is moved; detecting the image of a target, which is contained in the image of the subject represented by image data that is obtained from the solid-state electronic image sensing device at least at one position among positions of the imaging lens at which the level of the focusing data obtained is equal to or greater than a prescribed threshold value, in increments of a second prescribed distance that is less than the first prescribed distance; and deciding on the position of the imaging lens as the in-focus position based upon data that corresponds to the target detected.

In accordance with the first aspect of the present invention, the imaging lens is moved in increments of a first prescribed distance along the direction of the optic axis and focusing data representing degree of focus of the image of the subject is obtained at every position to which the lens is moved. The image of a target, which is contained in the image of the subject represented by image data obtained from the solid-state electronic image sensing device at least at one position among positions of the imaging lens at which the level of the focusing data is equal to or greater than a prescribed threshold value, is detected in increments of a second prescribed distance, which is less than the first prescribed distance. The position of the imaging lens is decided on as the in-focus position based upon data that corresponds to the target detected by the target detecting device.

Since it is attempted to detect the target from the image of the subject obtained in a case where the focusing data is equal to or greater than a prescribed threshold value, it is easier to detect the target accurately. The position of the imaging lens is decided on based upon the image data representing the image of the detected target. The position of the imaging lens can therefore be decided so as to bring the image of the target into focus.

The apparatus may further comprise a focusing target area deciding device for deciding one or a plurality of focusing target areas based upon the target detected by the target detecting device; and a weighting coefficient deciding device for deciding a weighting coefficient in such a manner that a weighting coefficient of the target is enlarged in the one or plurality of focusing target areas decided by the focusing target area deciding device. In this case the in-focus position deciding device would decide on the position of the imaging lens as the in-focus position based upon image data, which is obtained from the focusing target area decided by the focusing target area deciding device, from among the image data that is output from the solid-state electronic image sensing device.

According to a second aspect of the present invention, the foregoing object is attained by providing an apparatus for deciding an in-focus position of an imaging lens, comprising: a solid-state electronic image sensing device for sensing the image of a subject and outputting image data representing the image of the subject; a first focusing data output device for moving an imaging lens, which has been placed in front of the solid-state electronic image sensing device, along the direction of the optic axis in increments of a first prescribed distance and outputting first focusing data representing degree of focus of the image of the subject at every position to which the lens is moved; a target-image determination device for determining whether the image of a target is contained in the image of the subject represented by image data that is output from the solid-state electronic image sensing device at least at one position among positions of the imaging lens at which the level of the first focusing data that has been output from the first focusing data output device is equal to or greater than a prescribed threshold value; a focusing range deciding device for deciding a focusing range, which contains the position of the imaging lens prevailing when the target-image determination device has determined that the target is contained in the image of the subject, among ranges in which the imaging lens is situated in such a manner that the level of the first focusing data that has been output from the first focusing data output device is equal to or greater than a threshold value continuously; a second focusing data output device for moving the imaging lens along the direction of the optic axis in increments of a second prescribed distance, which is less than the first prescribed distance, in the focusing range that has been decided by the focusing range deciding device, and outputting second focusing data representing degree of focus of the image of the subject at every position to which the lens is moved; and an in-focus position deciding device for deciding on the position of the imaging lens, at which the image of the subject is brought into focus based upon the second focusing data that has been output from the second focusing data output device, as the in-focus position.

The second aspect of the present invention also provides a method suited to the above-described apparatus for deciding an in-focus position of an imaging lens. More specifically, there is provided a method of deciding an in-focus position of an imaging lens comprising the steps of: sensing the image of a subject using a solid-state electronic image sensing device and obtaining image data representing the image of the subject; moving an imaging lens, which has been placed in front of the solid-state electronic image sensing device, along the direction of the optic axis in increments of a first prescribed distance and obtaining first focusing data representing degree of focus of the image of the subject at every position to which the lens is moved; determining whether the image of a target is contained in the image of the subject represented by image data that is obtained from the solid-state electronic image sensing device at least at one position among positions of the imaging lens at which the level of the first focusing data obtained is equal to or greater than a prescribed threshold value; deciding a focusing range, which contains the position of the imaging lens prevailing when it has been determined that the target is contained in the image of the subject, among ranges in which the imaging lens is situated in such a manner that the level of the first focusing data obtained will be equal to or greater than a threshold value continuously; moving the imaging lens along the direction of the optic axis in increments of a second prescribed distance, which is less than the first prescribed distance, in the focusing range decided, and obtaining second focusing data representing degree of focus of the image of the subject at every position to which the lens is moved; and deciding on the position of the imaging lens, at which the image of the subject is brought into focus based upon the second focusing data, as the in-focus position.

In accordance with the second aspect of the present invention, the imaging lens is moved in increments of a first prescribed distance along the direction of the optic axis and first focusing data representing degree of focus of the image of the subject is obtained at every position to which the lens is moved. It is determined whether the image of a target is contained in the image of the subject represented by image data obtained from the solid-state electronic image sensing device at least at one position among positions of the imaging lens at which the level of the first focusing data is equal to or greater than a prescribed threshold value. A focusing range is decided, namely a range that contains the position of the imaging lens prevailing when it has been determined that the target is contained in the image of the subject, among ranges in which the imaging lens is situated in such a manner that the level of the first focusing data obtained will be equal to or greater than a threshold value continuously. The imaging lens is moved along the direction of the optic axis in increments of a second prescribed distance, which is less than the first prescribed distance, in the focusing range decided, and second focusing data is obtained at every position to which the lens is moved. The position of the imaging lens at which the image of the subject is brought into focus based upon the second focusing data obtained is decided upon as the in-focus position.

In accordance with the second aspect of the present invention, a target area is detected in the image of a subject obtained in a case where first focusing data is equal to or greater than a prescribed threshold value. A focusing range within which the image of a subject that contains the target will be sensed is decided, the imaging lens is moved a prescribed distance at a time in the focusing range thus decided, second focusing data is obtained and the in-focus position of the imaging lens is decided. Thus the position of the imaging lens is decided in such a manner that the target will come into focus.

The target-image determination device may be so adapted as to detect and determine, for every position of the imaging lens, the target contained in the image of the subject represented by image data that is output from the solid-state electronic image sensing device at a position of the imaging lens at which the level of the first focusing data that has been output from the first focusing data output device is equal to or greater than the prescribed threshold value. In this case the second focusing data output device would move the imaging lens along the direction of the optic axis within the focusing range that has been decided by the focusing range deciding device and would output the second focusing data, which represents the degree of focus of the target detected by the target determination device among the images of the subject, at every position to which the lens is moved.

The second focusing data output device may be so adapted as to move the imaging lens along the direction of the optic axis in the focusing range that has been decided by the focusing range deciding device, and to output the second focusing data, which represents the degree of focus of the image within the target area decided based upon all targets that have been detected by the target determination device among images of the subject, at every position to which the lens is moved.

The apparatus may further comprise a sub-target area deciding device for deciding one or a plurality of sub-target areas based upon all of the targets; and a weighting coefficient deciding device for deciding a weighting coefficient in such a manner that a weighting coefficient of the target area is enlarged in the one or plurality of sub-target areas decided by the sub-target area deciding device. In such case the second focusing data output device would move the imaging lens (move the lens again) along the direction of the optic axis within the focusing range that has been decided by the focusing range deciding device and would output the second focusing data, which represents the degree of focus of the target detected by the target determination device among images of the subject, at every position to which the lens is moved while adjusting the level of the second focusing data based upon the weighting coefficient that has been decided by the weighting coefficient deciding device.

It may be so arranged that movement of the imaging lens in the first focusing data output device is performed from the NEAR side. In such case the target determination device would execute processing to determine whether the image of the subject in the subject determination device contains a target whenever the imaging lens is moved. The apparatus may further comprise an imaging-lens movement control device for controlling the first focusing data output device so as to halt movement of the imaging lens in response to detection of the target. It may be construed that an important target is close to the image sensing device. Since movement of the imaging lens is halted in response to detection of such an important target, the position of the imaging lens can be decided comparatively quickly.

Naturally, it may be so arranged that movement of the imaging lens in the first focusing data output device is performed from the INF (infinity) side, or it may be so arranged that movement of the imaging lens in the first focusing data output device is performed from either the NEAR side or INF side in accordance with a setting. The apparatus may further comprise a setting device for setting direction of movement of the imaging lens in the first focusing data output device. In such case movement of the imaging lens in the first focusing data output device would be performed from the NEAR side or INF side in accordance with the setting made by the setting device.

The apparatus may further comprise an image sensing mode determination device for determining whether a short-distance image sensing mode or a long-distance image sensing mode has been set; and a device for setting movement of the imaging lens in the first focusing data output device in such a manner that movement is performed from the NEAR side in response to a determination by the image sensing mode determination device that the short-distance image sensing mode has been set and from the INF side in response to a determination by the image sensing mode determination device that the long-distance image sensing mode has been set.

Furthermore, in a case where the imaging lens is a zoom lens, movement of the imaging lens in the first focusing data output device is performed from the NEAR side or INF side in accordance with the zoom magnification of the zoom lens.

The target-image determination device would determine whether the image of the subject represented by the image data that is output from the solid-state electronic image sensing device contains a target at a position of the imaging lens that corresponds to a first maximal value (maximal value of an envelope signal obtained from the focusing data) equal to or greater than the prescribed threshold value in the first focusing data that has been output from the first focusing data output device.

Distance travelled by the imaging lens in the first focusing data output device may be greater than distance travelled by the imaging lens in the second focusing data output device.

Detection of the target is performed based upon at least one among target likeliness in the target area, size of the target, brightness of the target and position of the target area, by way of example.

The apparatus may further comprise a display device for displaying the image of the subject, which is represented by the image data that has been output from the solid-state electronic image sensing device, on a display screen; and a display control device for controlling the display device so as to display the area of the detected target on the image of the subject.

The apparatus may further comprise a display device for displaying the image of the subject, which is represented by the image data that has been output from the solid-state electronic image sensing device, on a display screen; and a display control device for controlling the display device so as to display the target area on the image of the subject. The user can ascertain at a glance where the target area and the focus target area are located.

The target is a face or an eye, by way of example.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 13 to 15 illustrate ways to decide weighting;

DESCRIPTION OF THE PREFERRED EMBODIMENTS

Preferred embodiments of the present invention will now be described in detail with reference to the drawings.

Figure 1:
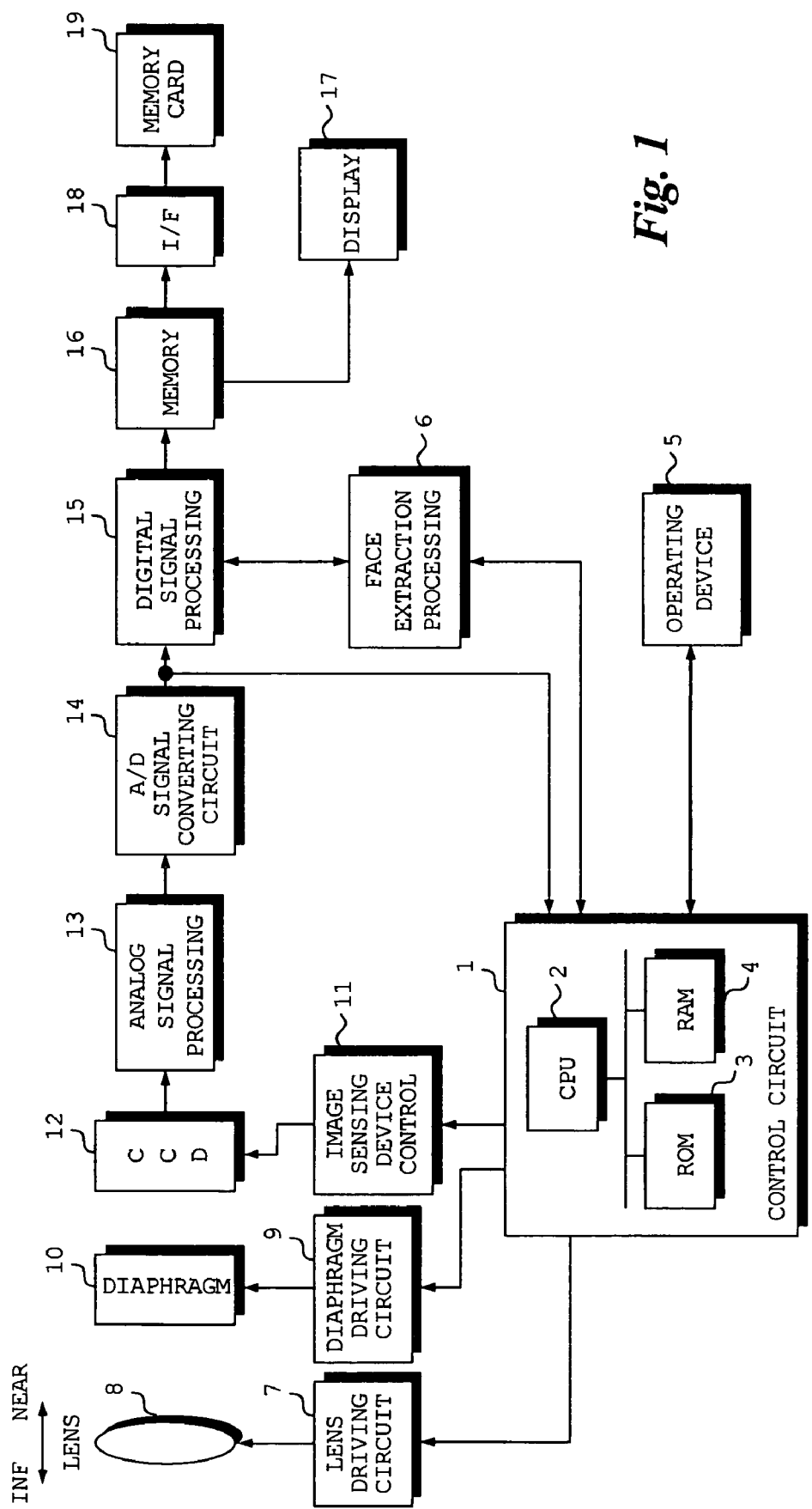
FIG. 1 is a block diagram illustrating the electrical structure of a digital still camera.

FIG. 1 is a block diagram illustrating the electrical configuration of a digital still camera according to an embodiment of the present invention.

The digital still camera according to this embodiment is so adapted that a face in the image of a subject will come into focus in suitable fashion.

The operation of the overall digital still camera is controlled by a control circuit 1. The control circuit 1 includes a CPU 2, a ROM 3 in which the operating program of the digital still camera and prescribed data, etc., have been stored, and a RAM 4 for storing data temporarily.

The digital still camera is provided with an operating device 5 having switches and buttons such as a shutter-release button of two-step stroke type. An operating signal that is output from the operating device 5 is input to the control circuit 1.

A diaphragm 10 and imaging lens 8 are provided in front of a CCD 12. The imaging lens 8 is supported so as to be freely movable along the direction of the optic axis of the lens. [The side of the lens facing the CCD 12 is referred to as the "NEAR" side, and the side facing away from the CCD 12 is referred to as the "INF" (infinity) side.] The position of the lens is controlled by a lens driving circuit 7 in such a manner that the image of the subject (the image of a face in a case where the image of the subject contains the image of a face, as will be described later) is focused and formed on the photoreceptor surface of the CCD 12. The diaphragm 10 has its f-stop number controlled by a diaphragm driving circuit 9 in such a manner that an appropriate amount of exposure is obtained. When the image of a subject is sensed, a video signal representing the image of the subject that has been formed on the photoreceptor surface of the CCD 12 is output under the control of a control circuit 11 for controlling the image sensing device. The video signal that has been output from the CCD 12 is input to an analog signal processing circuit 13. The lens driving circuit 7, diaphragm driving circuit 9 and image sensing device control circuit 11 are controlled by the control circuit 1.

The video signal is subjected to prescribed analog signal processing such as a white balance adjustment in the analog signal processing circuit 13. The video signal that has been output from the analog signal processing circuit 13 is converted to digital image data in an analog/digital signal converting circuit 14 and the digital image data is input to a digital signal processing circuit 15 and to the control circuit 1.

High-frequency components are extracted from the input digital image data in the control circuit 1, whereby focusing data is obtained. The focusing data obtained is integrated over the entire image or in an area that is part of the image to thereby obtain a focus evaluation value. The imaging lens 8 is controlled by the lens driving circuit 7 based upon the obtained focus evaluation value in such a manner that the image of the subject is focused upon the photoreceptor surface of the CCD 12.

Further, the digital image data is subjected to prescribed digital signal processing such as a gamma correction in the digital signal processing circuit 15. The image data that has been output from the digital signal processing circuit 15 is applied to a display unit 17 via a memory 16. The image of the subject is displayed on the display screen of the display unit 17. Image data that has been output from the digital signal processing circuit 15 is input also to a face extraction processing circuit 6. The latter extracts the image of a face contained in the image of the subject represented by the image data that has been output from the digital signal processing circuit 15. Data representing the extracted image of the face and data such as position and size indicative of the area of the extracted face is applied to the control circuit 1. As will be described later in greater detail, focusing control is carried out using the data representing the image of the face. There is no particular limitation on the method of extracting the face. Methods which may be used include a method that relies upon brightness, a method using color or a method using both brightness and color.

If the shutter-release button is pressed through the first step of its stroke, focusing control is performed in a manner described later. If the shutter-release button is pressed through the second step of its stroke, the image data that has been output from the digital signal processing circuit 15 is applied to and stored temporarily in a memory 16, as described above. The image data is recorded by reading it from the memory 16 and applying it to a memory card 19 via an interface 18.

Figure 2:
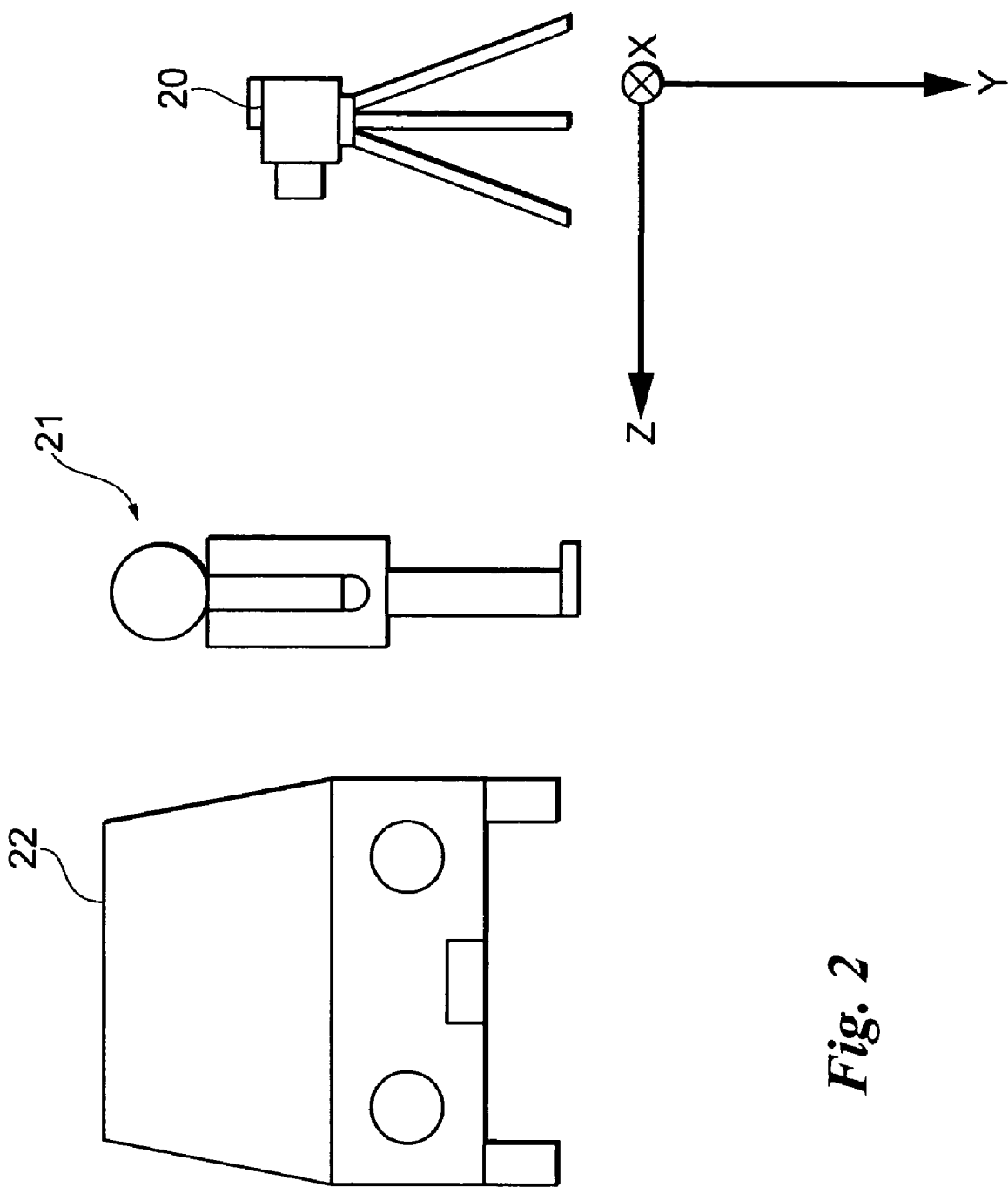
FIG. 2 illustrates the relationship between a digital still camera and subjects.

FIG. 2 illustrates the relationship between subjects and a digital still camera.

As illustrated in FIG. 2, a digital still camera 20 is arranged facing subjects 21 and 22. Subject 21 is a person and subject 22 a vehicle.

In this embodiment, the direction in which the imaging lens of the digital still camera 20 moves along the optic axis of the lens is defined as the direction along the Z axis. The plane in which the Z axis is the normal line is defined as the XY plane.

Figure 3:
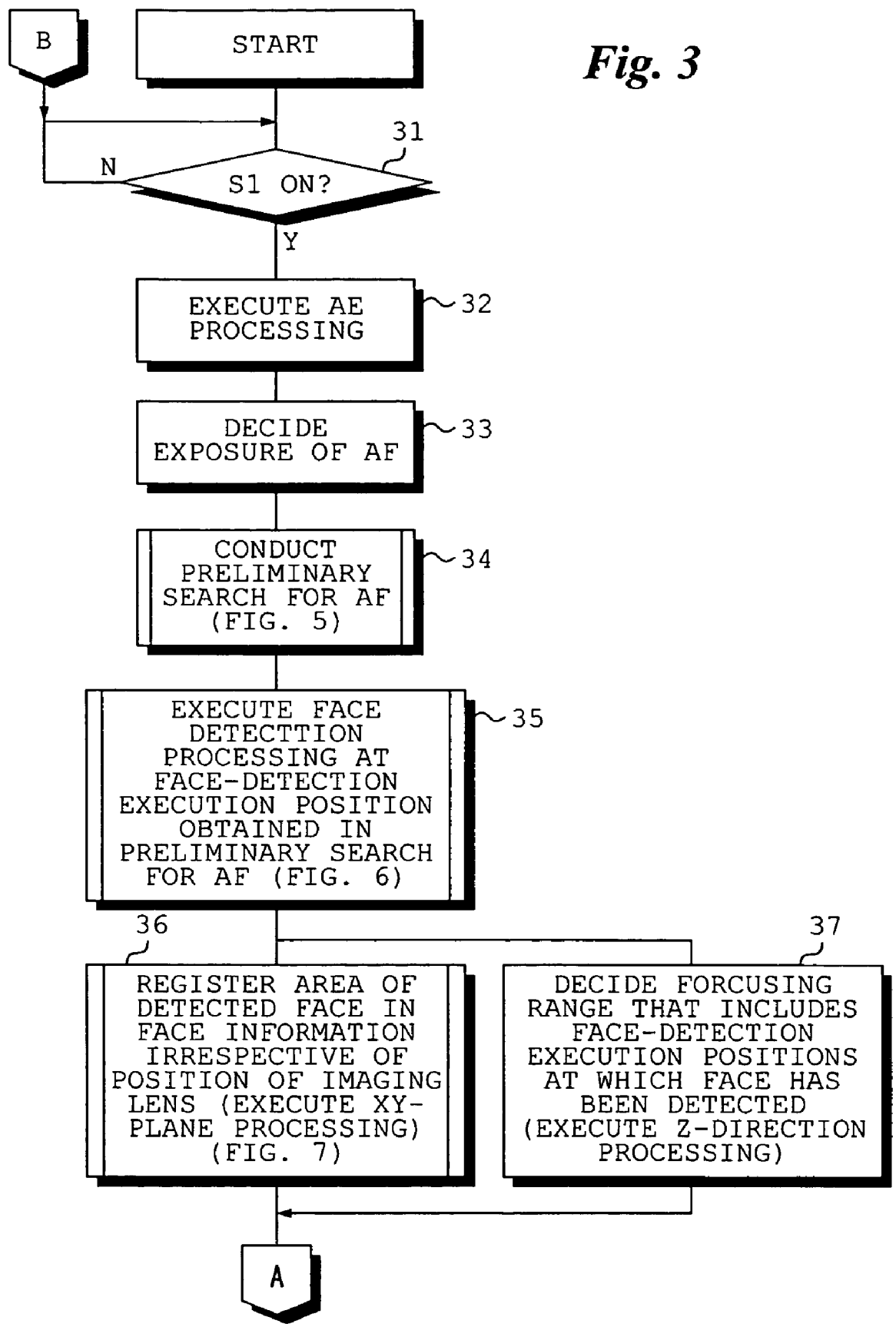
FIGS. 3 and 4 are flowcharts illustrating recording processing.
Figure 4:
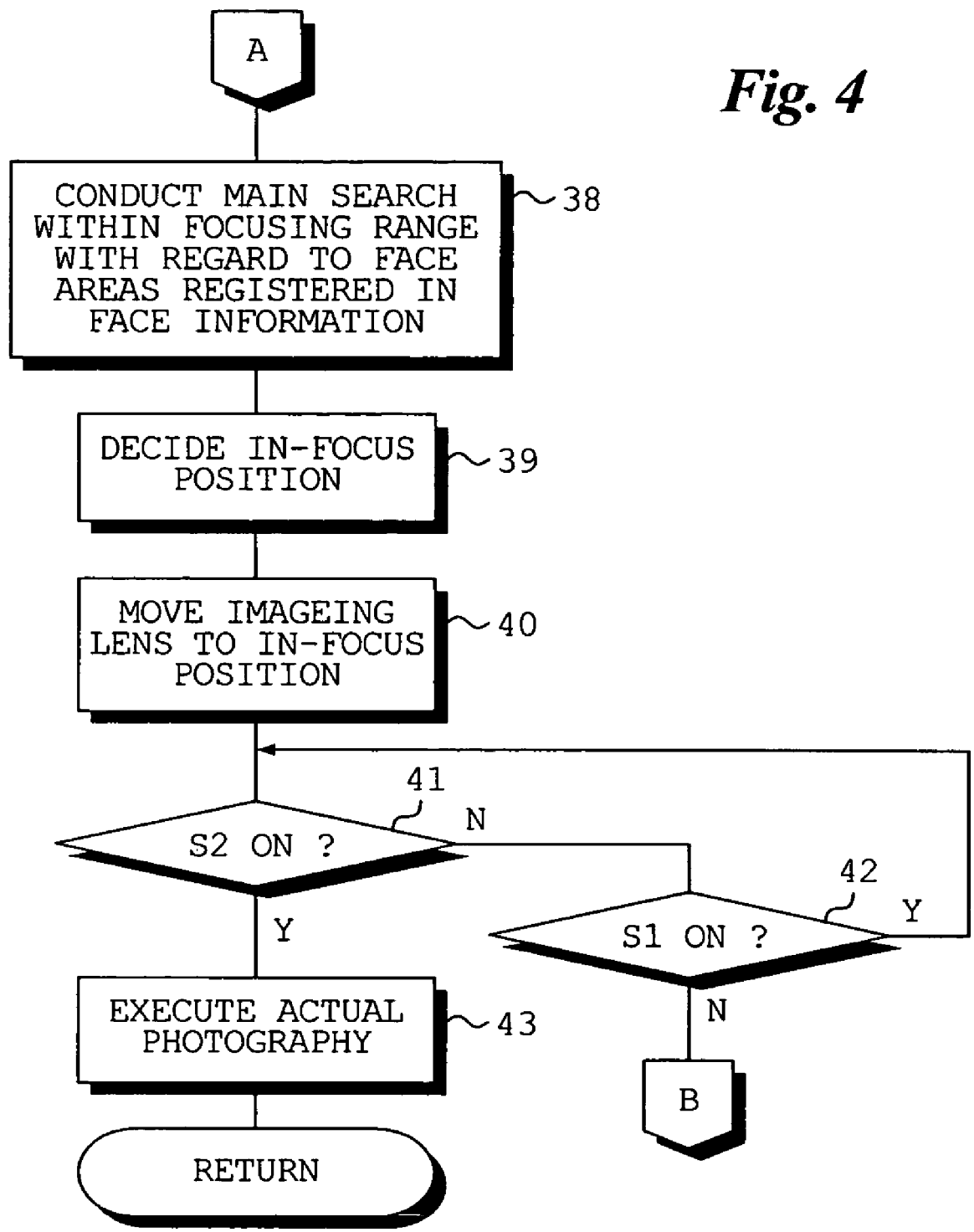

FIGS. 3 and 4 are flowcharts illustrating recording processing executed by the digital still camera.

Sensing of the image of the subject by the CCD 12 continues and image data representing the image of the subject is obtained in the manner described above. If the shutter-release button is pressed through the first step of its stroke ("YES" at step 31), automatic exposure (AE) processing in which luminance components are extracted from the obtained image data is executed (step 32). An appropriate amount of exposure is calculated based upon the luminance components extracted (step 33). The diaphragm 10 and the shutter speed (so-called "electronic shutter") of the CCD 12 are controlled in such a manner that the calculated amount of exposure is achieved.

Next, a preliminary search for autofocus (AF) is carried out (step 34).

Figure 5:
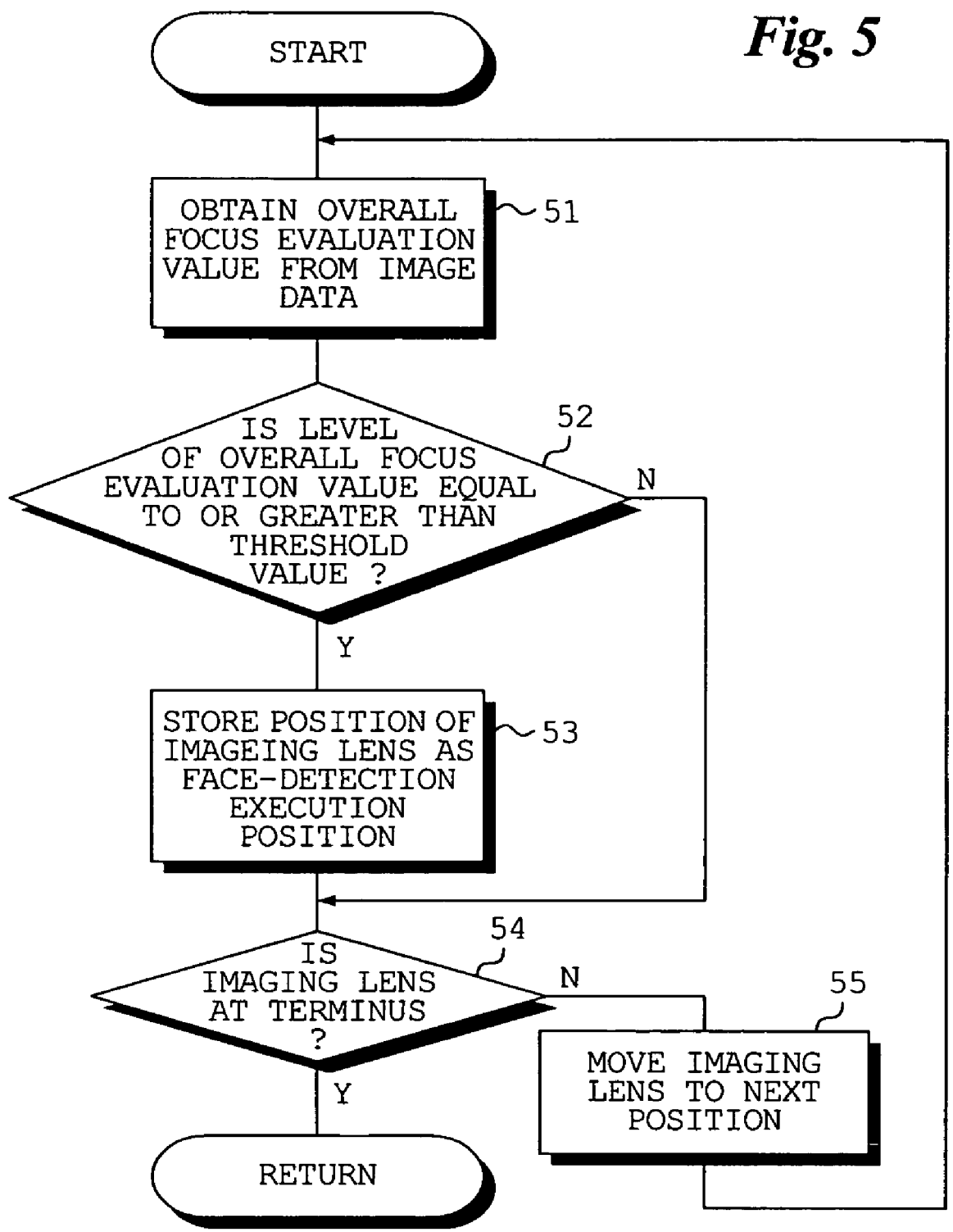
FIG. 5 is a flowchart illustrating preliminary search processing for autofocus.

FIG. 5 is a flowchart illustrating preliminary search processing for AF.

Figure 9A:
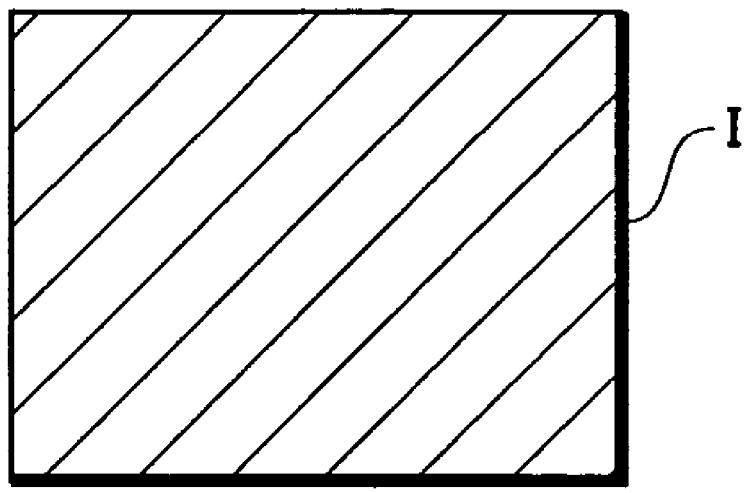
FIG. 9A illustrates the area of the image of a subject when an overall focus evaluation value is obtained.

The imaging lens 8 is freely movable within a prescribed range along the Z direction and is initially positioned at an initial position. The image of the subject is sensed in a state in which the imaging lens 8 is at the initial position, and image data representing the entirety I of the image of the subject is obtained, as indicated by the hatching in FIG. 9A. An overall focus evaluation value is obtained by extracting and integrating high-frequency components from the image data obtained (step 51).

If the overall focus evaluation value obtained is equal to or greater than a prescribed threshold value ("YES" at step 52), then it is construed that the image of the subject obtained at the position of the imaging lens 8 that prevailed when the overall focus evaluation value was obtained is in comparatively good focus. This position of the imaging lens 8 is stored as a face-detection execution position (step 53). Processing for detecting a face in the image of a subject is executed, as will be described later, at the face-detection execution positions. When a face is detected, high-frequency components are extracted from the detected face to thereby obtain a face-area focus evaluation value. A face-detection execution position at which the face-area focus evaluation value is maximized is decided upon as the position of the imaging lens 8 where the face of the image of the subject is in best focus. If the overall focus evaluation value obtained is less than the threshold value ("NO" at step 52), then the processing of step 53 is skipped.

If the imaging lens 8 is not at the terminus of the range of movement thereof ("NO" at step 54), then the imaging lens 8 is moved a prescribed distance and is positioned at the next position (step 55). The processing of steps 51 to 53 is repeated until the imaging lens 8 arrives at the terminus in the range of movement ("YES" at step 54).

Figure 8A:
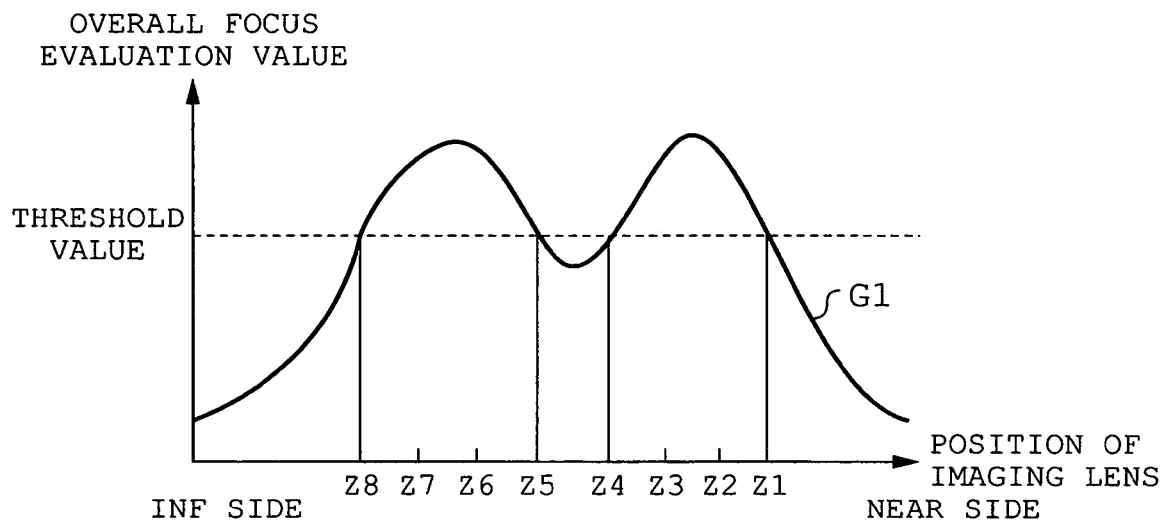
FIG. 8A illustrates the relationship between the position of an imaging lens and an overall focus evaluation value.

FIG. 8A indicates focus evaluation values and face-detection execution positions obtained by the preliminary search processing for AF.

The horizontal axis in FIG. 8A is the direction (Z direction) of movement of the imaging lens 8, and the vertical axis is the plot of overall focus evaluation values.

A graph G1 of overall focus evaluation values is obtained by obtaining the overall focus evaluation values (first focusing data) while moving the imaging lens 8 in increments of the prescribed distance, as described above. In the graph G1, the positions of the imaging lens 8 corresponding to the portion of the graph equal to or greater than a threshold value are Z1, Z2, Z3, Z4, Z5, Z6, Z7 and Z8. These positions Z1, Z2, Z3, Z4, Z5, Z6, Z7 and Z8 of the imaging lens are positions stored as face-detection execution positions.

With reference again to FIG. 3, when the preliminary search for AF ends, face detection processing (which may be processing for detecting an eye) is executed (step 35) at the face-detection execution position obtained in the preliminary search for AF.

Figure 6:
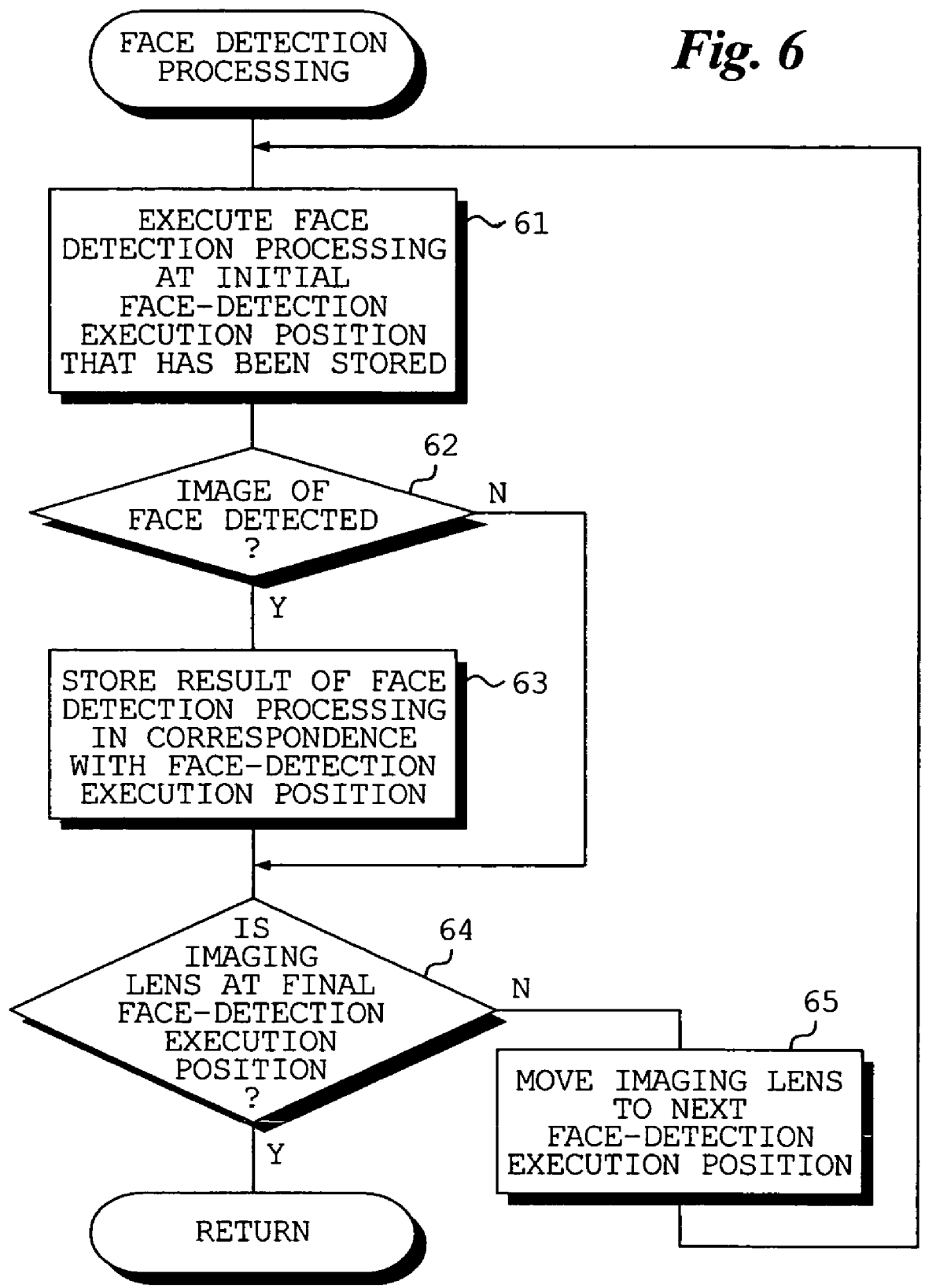
FIG. 6 is a flowchart illustrating face detection processing.

FIG. 6 is a flowchart illustrating face detection processing.

The image of the subject is sensed upon positioning the imaging lens 8 at the initial face-detection execution position among the face-detection execution positions that have been stored. The image data representing the image of the subject is input to the face extraction processing circuit 6, which proceeds to detect a face contained in the image of the subject (step 61). If a face is detected ("YES" at step 62), the result of face detection processing (position and size, etc., of the detected image area) is stored in correspondence with the face-detection execution position at which the imaging lens 8 is situated. If a face is not detected ("NO" at step 62), then the processing of step 63 is skipped.

If the imaging lens is not at the final face-detection execution position ("NO" at step 64), the imaging lens 8 is moved to the next face-detection execution position (step 65). The processing of steps 61 to 63 is repeated until the imaging lens 8 arrives at the final face-detection execution position ("YES" at step 64).

Figure 10:
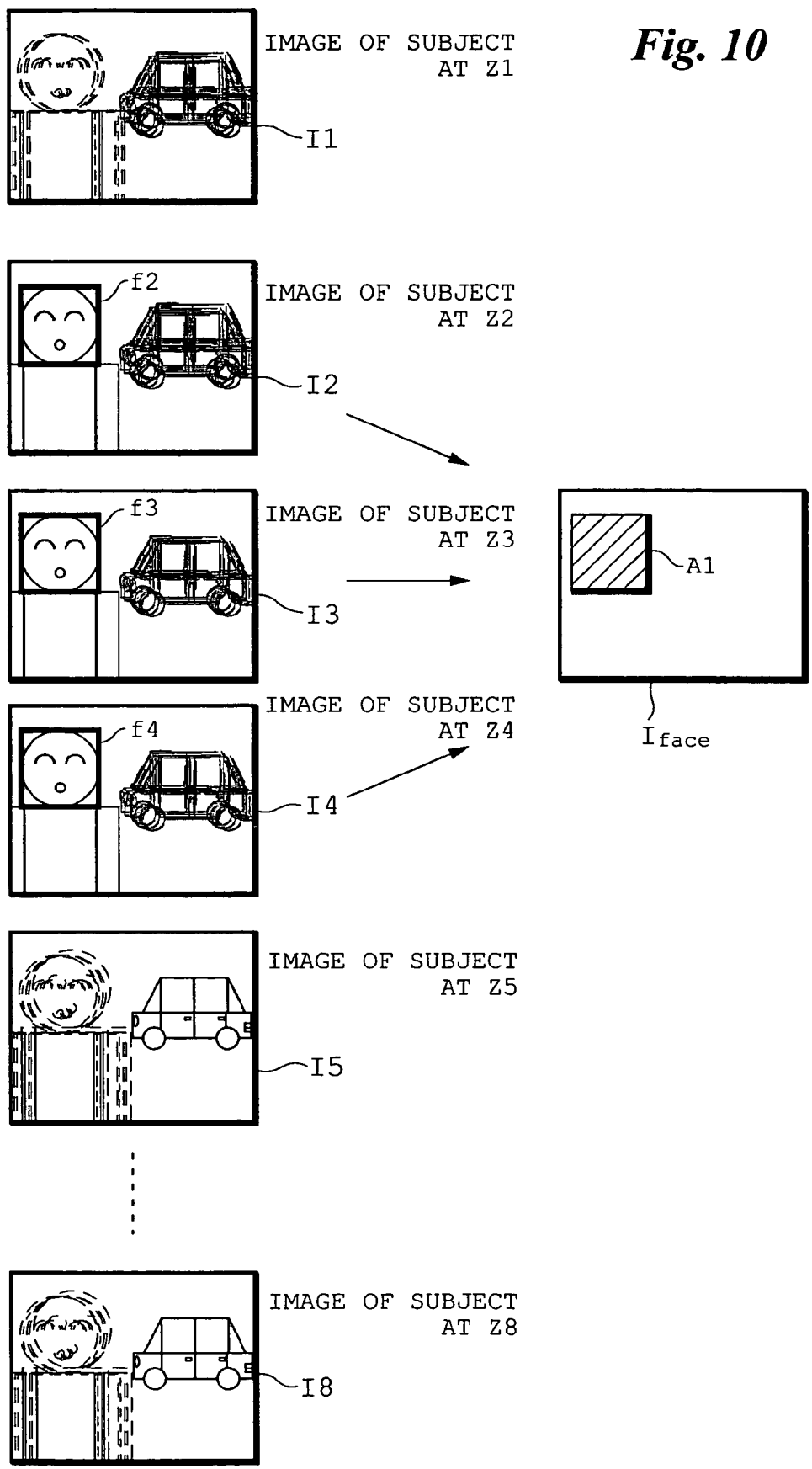
FIG. 10 illustrates the registration of faces of face information.

The left side of FIG. 10 shows entire images obtained by face detection processing and faces contained in respective ones of these entire images.

As mentioned above, the imaging lens 8 is positioned at each of the face-detection execution positions Z1, Z2, Z3, Z4, Z5, Z6, Z7 and Z8 and the image of the subject is sensed at each position, whereby subject images I1, I2, I3, I4, I5, I6, I7 and I8 are obtained. Among the subject images I1, I2, I3, I4, I5, I6, I7 and I8 in FIG. 10 obtained by imaging, the subject images I2, I3 and I4 contain faces f2, f3 and f4, respectively.

In the face detection processing, the faces f2, f3 and f4 are stored in correspondence with the face-detection execution positions Z2, Z3 and Z4.

With reference again to FIG. 3, processing (XY-plane processing) is executed to register the face area, detected when face detection processing is executed, in face information regardless of the position of the imaging lens (step 36). In addition, processing (Z-direction processing) for deciding a focusing range that includes the face-detection execution positions at which the face was detected is executed (step 37).

Figure 7:
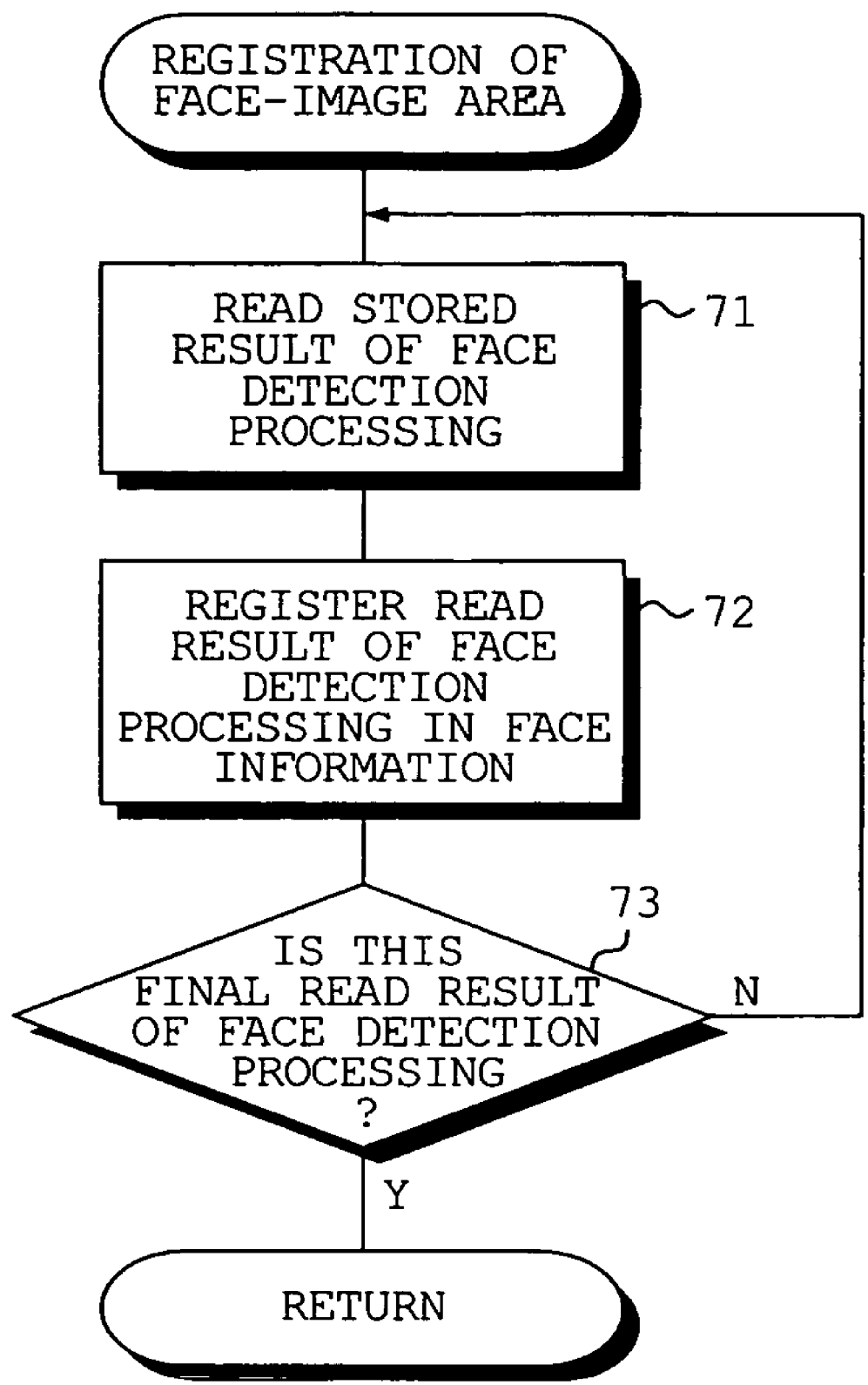
FIG. 7 is a flowchart illustrating processing for registering a face area.

FIG. 7 is a flowchart illustrating processing for registering a face area.

First, the stored result of face detection processing is read (step 71). The read result of face detection processing is registered in the face information (step 72). This reading of the results of face detection processing and registration of the results of face detection processing in the face information continues up to the final result of face detection processing (step 73).

The right side of FIG. 10 shows an example of face information.

As described above, faces f2, f3 and f4 are contained in subject images I2, I3 and I4, respectively, obtained by positioning the imaging lens 8 at the face-detection execution positions Z2, Z3 and Z4, respectively, and sensing the image of the subject at these positions. The positions and sizes of the images of these faces are registered as results of face detection processing in the same face information $I_{face}$ of one frame.

Thus, faces contained in the images of the subjects obtained at different positions of the imaging lens 8 are registered in the face information $I_{face}$. As a result, a face area A1 produced by overlapping the images f2, f3 and f4 of the faces obtained when the imaging lens 8 is situated at each of the face-detection execution positions Z2, Z3 and Z4, respectively, is registered as an area in which the faces are contained.

With reference again to FIG. 3, a focusing range that includes the face-detection execution positions at which faces are detected is decided (step 37) in concurrence with the processing (step 36) for registering face information.

Since faces have been detected when the imaging lens 8 is situated at the face-detection execution positions Z2, Z3 and Z4 among the positions Z1 to Z4 and Z5 to Z8 of the imaging lens 8 at which the overall focus evaluation value is equal to or greater than the threshold value, as illustrated in FIG. 8A and the left side of FIG. 10, the positions Z5 to Z8 of imaging lens 8 at which the overall focus evaluation value is equal to or greater than the threshold value are decided upon as the focusing range.

With reference to FIG. 4, face areas A1, A2 that have been registered in the face information $I_{face}$ undergo a main search in the focusing range that has been decided (step 38), and the position (in-focus position) of the imaging lens 8 at which the image of the face contained in the image of the subject is in focus is decided (step 39).

Figure 8B:
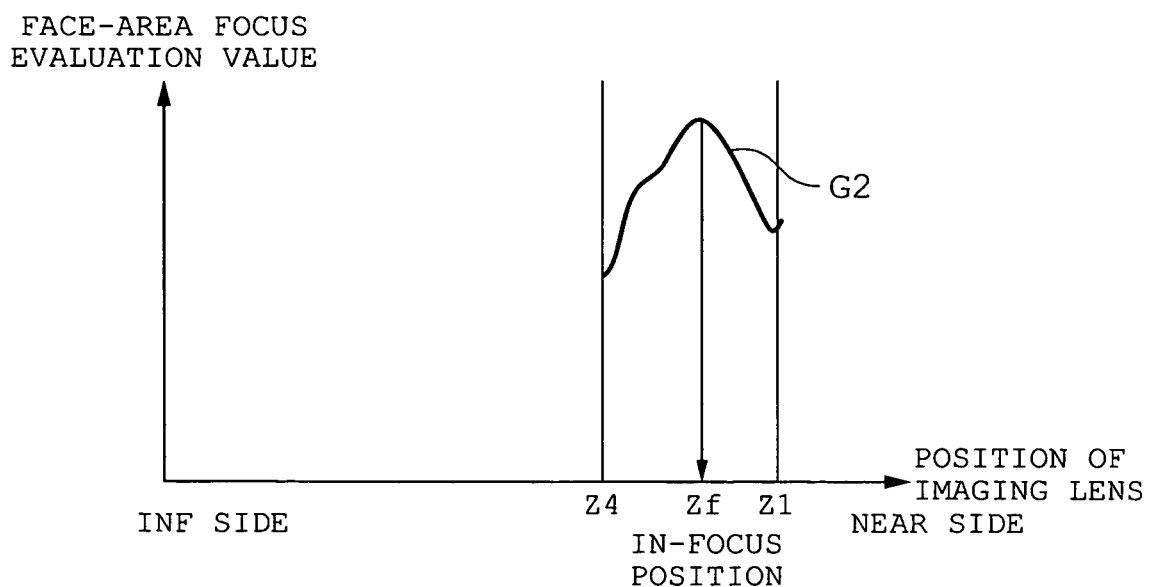
FIG. 8B illustrates the relationship between the position of an imaging lens and a face-area focus evaluation value.
Figure 9B:
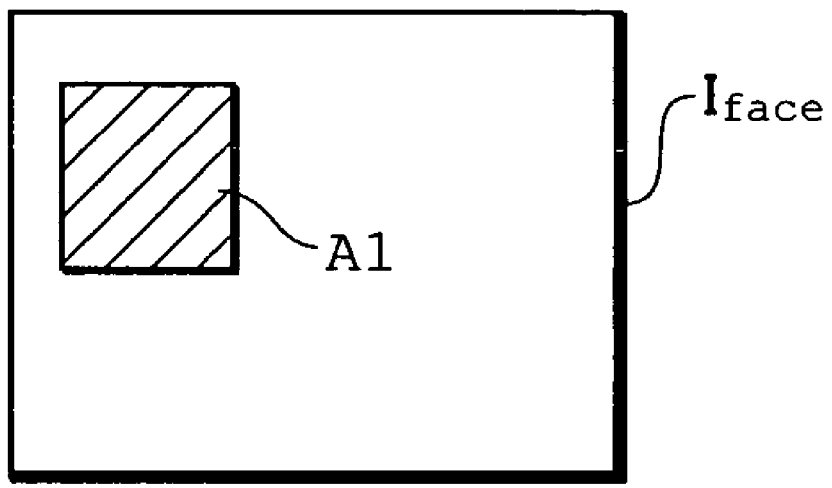
FIG. 9B illustrates an area when a face-area focus evaluation value is obtained.

As shown in FIG. 8B, the focusing range is a range over which the positions of the imaging lens 8 are defined by Z1 to Z4. The imaging lens 8 is moved in prescribed increments in the focusing range Z1 to Z4 and the image of the subject is sensed at each position to which the lens is moved. Focusing data (second focusing data) is extracted from image data representing the interior of face area A1 (indicated by the hatching in FIG. 9B) from the sensed image of the subject. An evaluation value of the extracted focusing data is obtained as the face-area focus evaluation value. By obtaining the face-area focus evaluation value while the imaging lens 8 is moved within the focusing range Z1 to Z4, a graph G2 of face-area focus evaluation values is obtained. This is the main search mentioned above. In the graph G2 obtained by the main search, position Zf of the imaging lens 8 at which the face-area focus evaluation value is maximized is decided upon as an in-focus position Zf.

With reference again to FIG. 4, when the in-focus position is decided, the imaging lens 8 is moved so as to be positioned at the in-focus position decided (step 40). The position to which the imaging lens 8 has been moved is that at which the face in the image of the subject is in best focus.

If the shutter-release button is pressed through the second step of its stroke ("YES" at step 41), actual picture-taking is performed at step 43. The image data obtained by actual picture-taking is recorded on the memory card 19.

If the shutter-release button continues to be pressed through the first step of its stroke ("YES" at step 42) without being pressed through the second step of its stroke ("NO" at step 41), then the determination as to whether or not the shutter-release button has been pressed through the second step of its stroke is performed repeatedly. If the shutter-release button stops being pressed through the first step of its stroke ("NO" at step 42) without being depressed through the second step of its stroke ("NO" at step 41), then control returns to the processing of step 31.

In the embodiment described above, the traveling distance of the imaging lens 8 in the preliminary search (step 34) for AF may be made larger than the traveling distance of the imaging lens 8 in the main search (step 38). This makes it possible to shorten the time needed to perform the preliminary search for AF.

Figure 11:
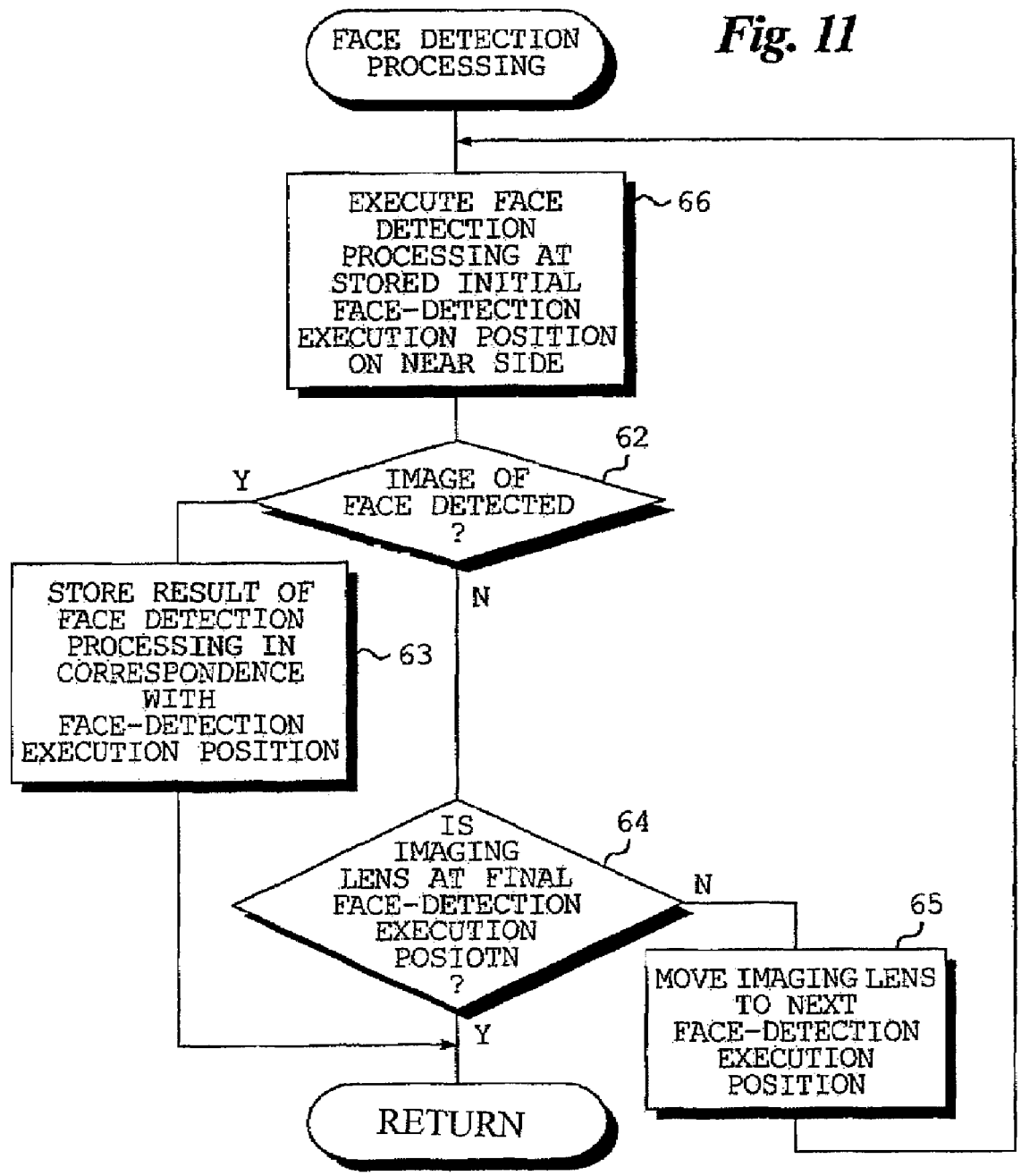
FIG. 11 is a flowchart of other processing for face detection.

FIG. 11 is a flowchart of other processing for face detection. Here processing steps identical with those shown in FIG. 6 are designated by like step numbers.

In the face detection processing illustrated in FIG. 11, the imaging lens 8 is moved in prescribed increments from the NEAR side to the INF side along the direction of the optic axis and processing for face detection is executed (step 66). If a face is detected ("YES" at step 62), the result of face detection processing is stored in correspondence with the face-detection execution position prevailing at this time (step 63) and process for detecting a face image ends.

Processing for detecting a face image ends in response to the first detection of a face among the images of the subjects obtained while the imaging lens 8 is moved. This initially detected face is that nearest the digital still camera 20. The imaging lens 8 can be positioned so as to bring the image of this face into focus. Further, since processing for detecting the face image ends in response to first detection of a face, the processing for detecting the face image can be terminated quickly.

Figure 12:
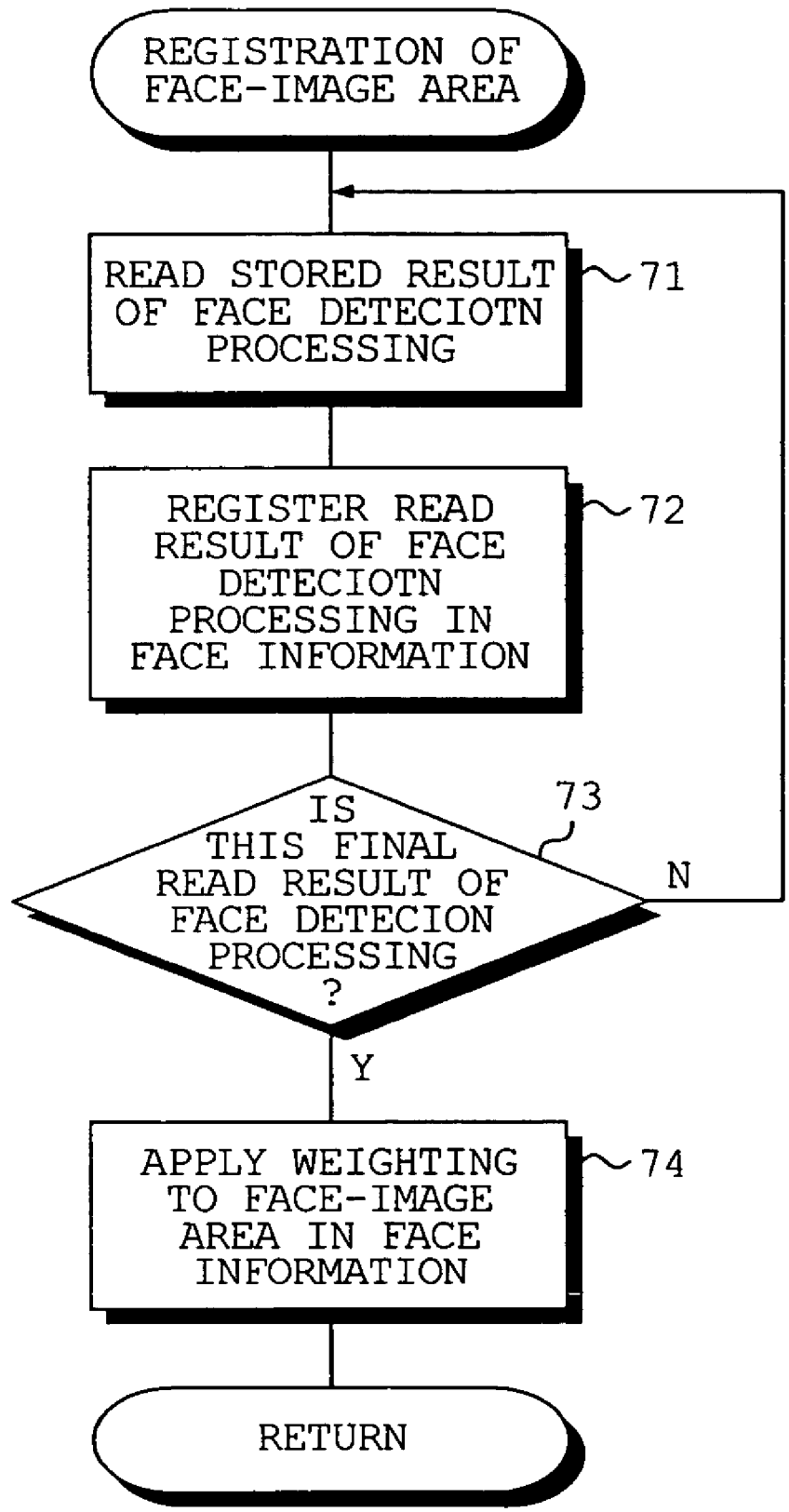
FIG. 12 is a flowchart of other processing for face-area registration.

FIG. 12 is a flowchart of other processing for registering a face area in face information. Here processing steps identical with those shown in FIG. 7 are designated by like step numbers and need not be described again.

In this processing for registering a face area, weighting is applied to a face-image area that has been registered in the face information in the manner described above (step 74).

How weighting is applied will be described with reference to FIGS. 13 to 15.

Figure 13:
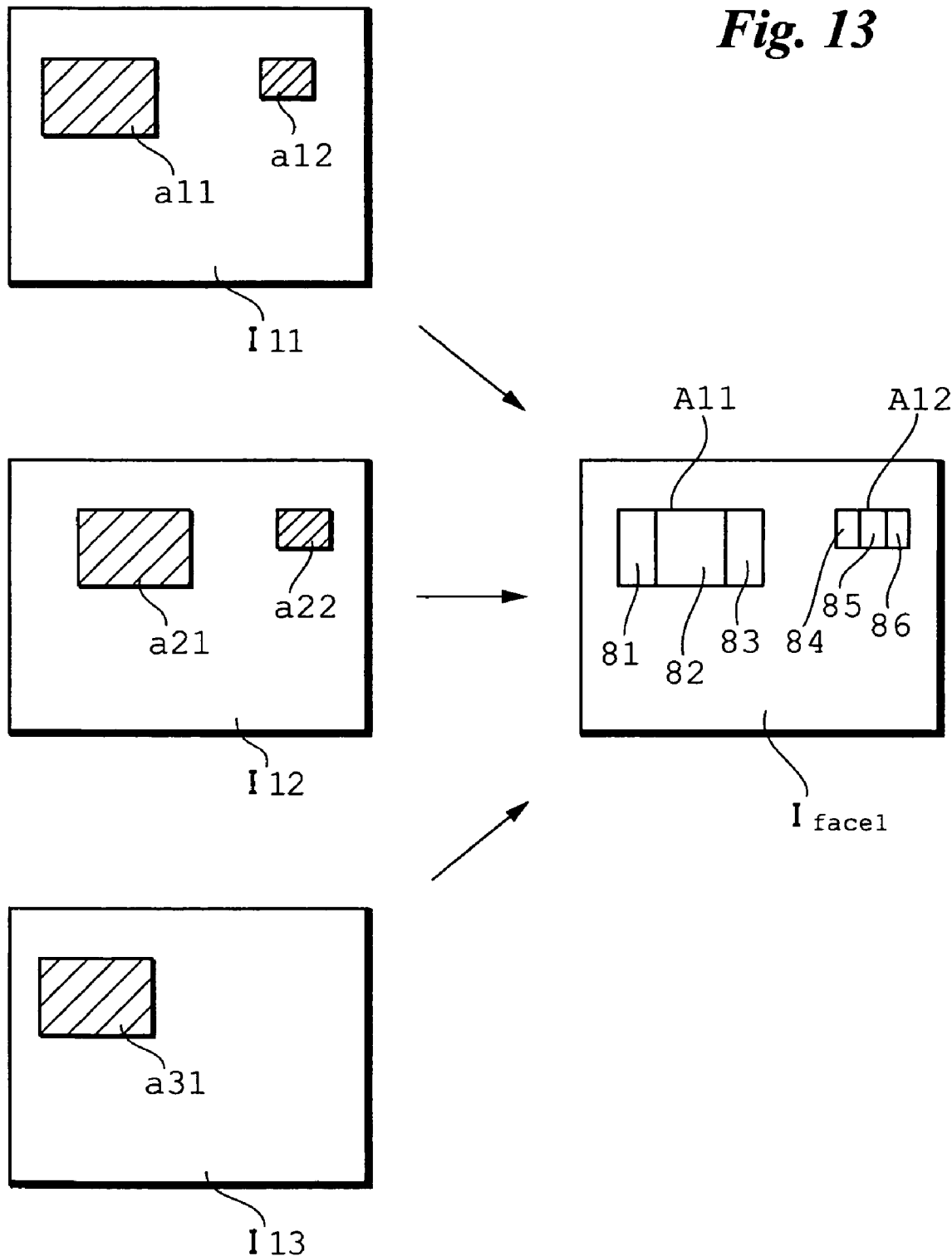

As shown in FIG. 13, it is assumed that subject images I11, I12 and I13 have been obtained by sensing the image of a subject while changing the position of the imaging lens 8 in the manner described above. It is assumed that subject image I11 contains faces a11 and a12, that subject image I12 contains faces a21 and a22, and that subject image I13 contains a face a31.

If the faces a11, a12, a21, a22 and a31 are registered in face information $I_{face1}$, the result is as shown on the right side of FIG. 13.

A face area (target area) A11 that has been registered in the face information $I_{face1}$ can be divided into three areas (sub-target image areas) 81, 82 and 83. The area 81 is an area that is contained in the two faces a11 and a31. The area 82 is an area contained in all three of the areas of faces a11, a21 and a31. The area 83 is an area contained in the two face images of faces a11 and a21.

Further, a face area A12 that has been registered in the face information $I_{face1}$ can also be divided into three areas 84, 85 and 86. The area 84 is an area contained in face a22, the area 85 is an area contained in faces a12 and a22, and the area 86 is an area contained in face a12.

The weighting in this case is the product of the number of face-detection execution positions at which a face has been detected and a constant k1. Hence, weighting coefficients of the areas 81, 82, 83, 84, 85 and 86 are 2k1, 3k1, 2k1, k1, 2k1 and k1, respectively.

By multiplying the face-area focus evaluation values obtained in the main search by these weighting coefficients, the face-area focus evaluation values are corrected and the above-mentioned graph G2 regarding the face-area focus evaluation values is obtained.

Figure 14:
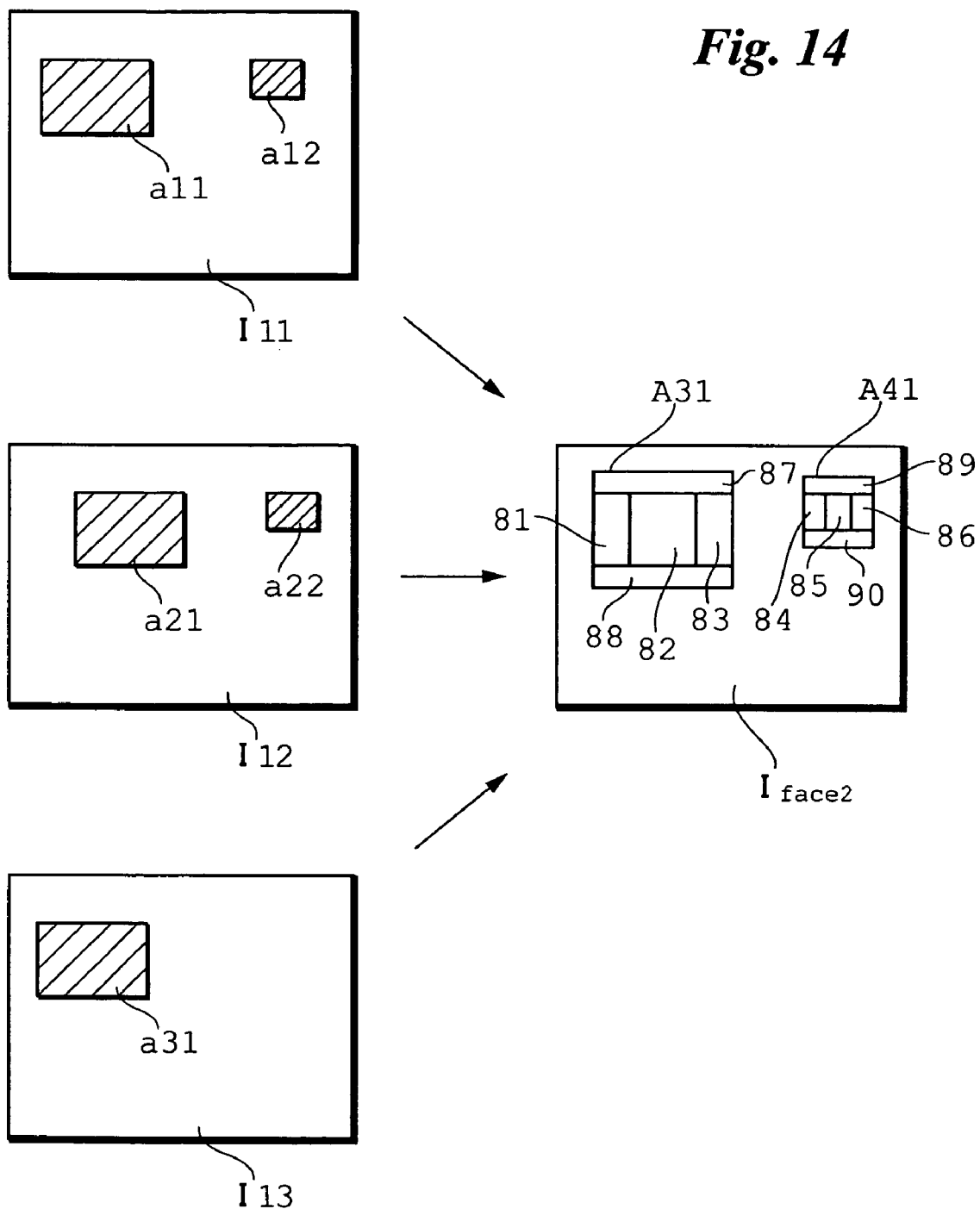

When the faces a11, a12, a21, a22 and a31 are registered in face information $I_{face2}$, the result is as shown on the right side of FIG. 14.

Face area A31 registered in face information $I_{face2}$ is the result of adding areas 87 and 88 to the top and bottom, respectively, of the face area A11 shown in FIG. 13. Similarly, face area A41 registered in face information $I_{face2}$ is the result of adding areas 89 and 90 to the top and bottom, respectively, of the face area A12 shown in FIG. 13.

Weighting is calculated as follows: (number of face-detection execution positions at which a face has been detected)× constant k1+(distance from face area)×constant k2. The weighting coefficients of areas 81, 82, 83, 84, 85, 86, 87, 88, 89 and 90 are 2k1+k2, 3k1+k2, 2k1+k2, k1+k2, 2k1+k2, k1+k2, k2, k2, k2 and k2, respectively.

When the faces a11, a12, a21, a22 and a31 are registered in face information $I_{face2}$, as shown in FIG. 15, the result is $I_{face3}$ indicated on the right side of FIG. 15.

Face area A51 registered in face information $I_{face3}$ is such that the areas 87 and 88 contained in the face area A31 of FIG. 14 have each been divided into areas 91 and 92. Similarly, the areas 89 and 90 contained in the face area A41 of FIG. 14 have each been divided into areas 93 and 94.

Weighting is calculated as follows: (number of face-detection execution positions at which a face has been detected)× constant k1×(distance from face area)×constant k2. The weighting coefficients of areas 81, 82, 83, 84, 85, 86, 87, 88, 89, 90, 91, 92, 93 and 94 are 2k1, 3k1, 2k1, k1, 2k1, k1, k2/2, k2, k2/2 and k2, respectively.

Figure 16A:
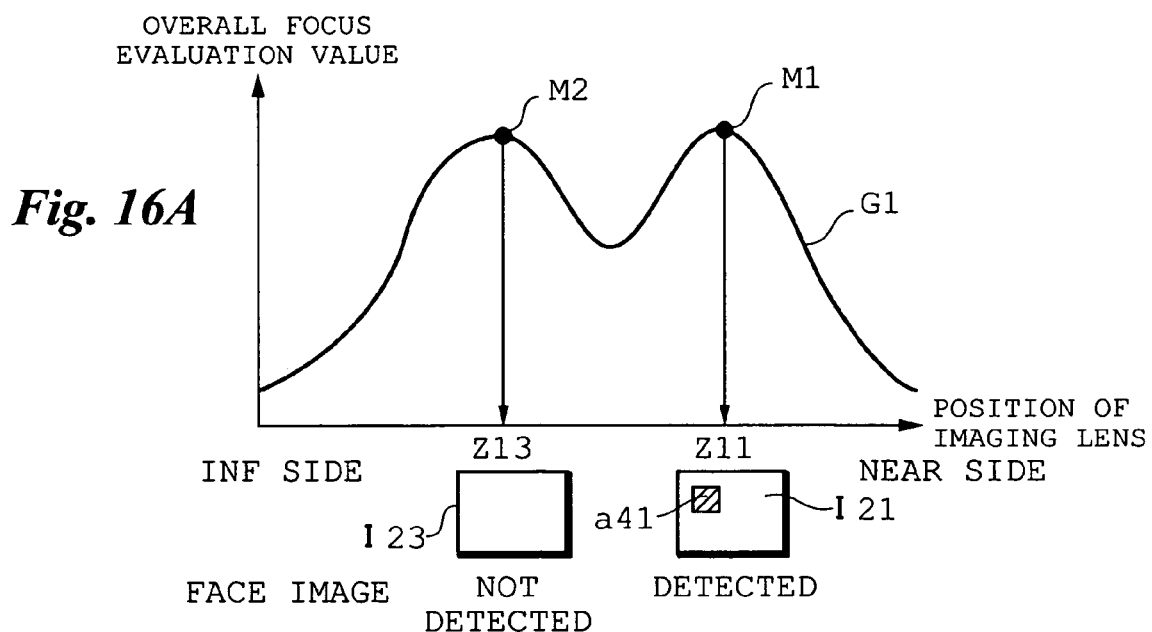
FIGS. 16A and 16B illustrate relationships between the position of an imaging lens and an overall focus evaluation value.
Figure 16B:
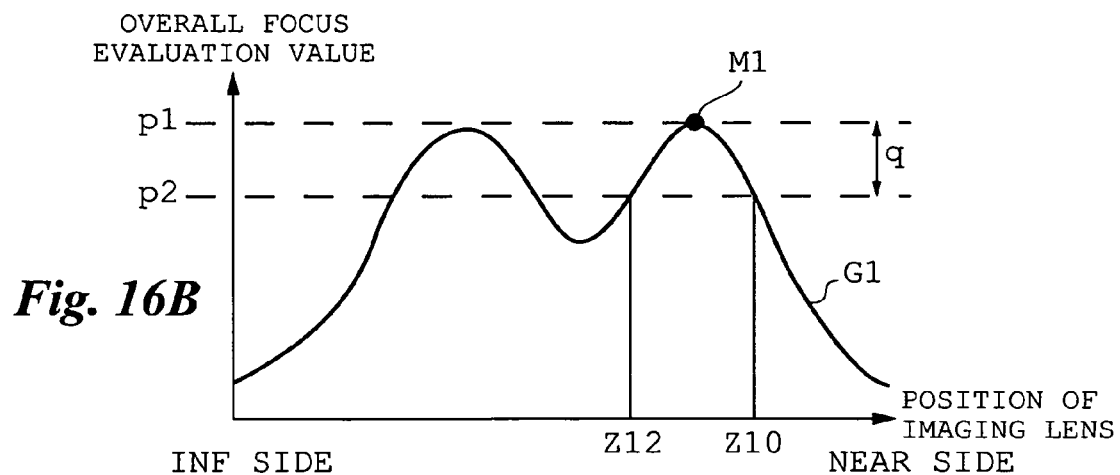
Figure 16C:
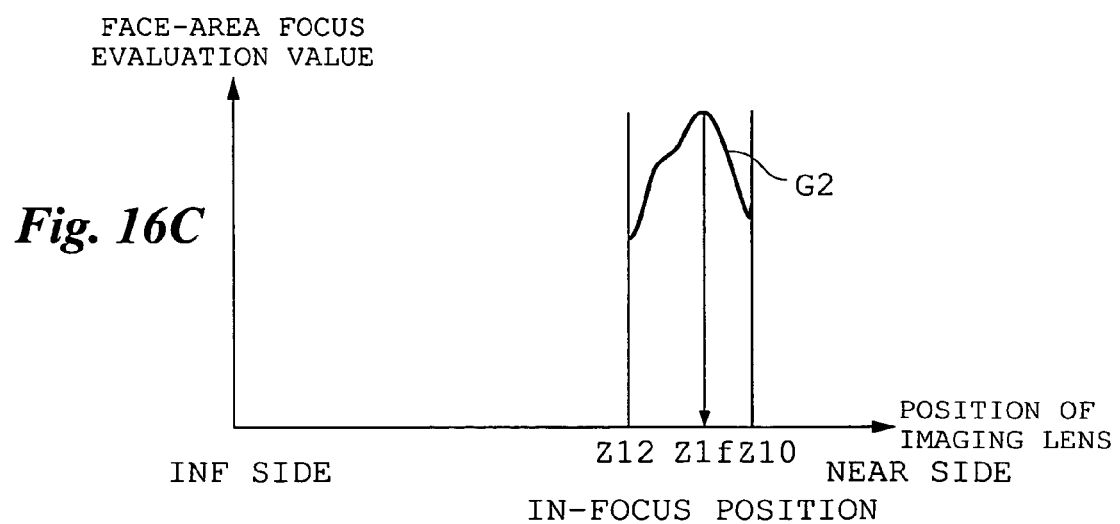
FIG. 16C illustrates the relationship between the position of an imaging lens and a face-area focus evaluation value in another embodiment.

FIGS. 16A to 16C illustrate another embodiment of the present invention.

In the embodiment described above, a range containing a face is decided as a focusing range from a range of overall focus evaluation values equal to or greater than a threshold value, and a main search is conducted within this focusing range. By contrast, in this embodiment in FIGS. 16A to 16C, maximal values are found from the graph G1 of overall focus evaluation values and face detection processing is executed at the positions of the imaging lens 8 that correspond to these maximal values. Positions of the imaging lens 8 in the vicinity of a maximal value at which a face has been detected are decided upon as the focusing range. The main search is conducted in the focusing range decided.

As shown in FIG. 16A, a graph G1 of overall focus evaluation values (the graph of an envelope signal) is obtained by conducting an AF preliminary search. Maximal values M1 and M2 of the graph G1 are detected and positions Z11 and Z13 of the imaging lens 8 corresponding to these maximal values M1 and M2, respectively, are detected. The imaging lens 8 is positioned at each of the positions Z11 and Z13 and the image of the subject is sensed, whereby subject images I21 and I23, respectively, are obtained. A face detection search to determine whether a face is contained in the obtained subject images I21 and I23 is conducted. Here it will be assumed that a face a41 is contained in the subject image I21.

If the face a41 is contained in the subject image I21 obtained when the imaging lens 8 is positioned at the position Z11, then, as shown in FIG. 16B, a range Z10 to Z12 is decided upon as the focusing range. The range Z10 to Z12 is one defined by points of intersection between the graph G1 and an overall focus integration value p2 obtained when an overall focus evaluation value p1 at the maximal value M1 is lowered a prescribed level q. Moreover, this range contains the maximal value M1.

If the focusing range is decided, then, as shown in FIG. 16C, a main search is conducted in this focusing range and the graph G2 of face-area focus evaluation values is obtained in the manner described above. An in-focus position Z1f of the imaging lens 8 is decided from the graph G2 obtained.

Figure 17A:
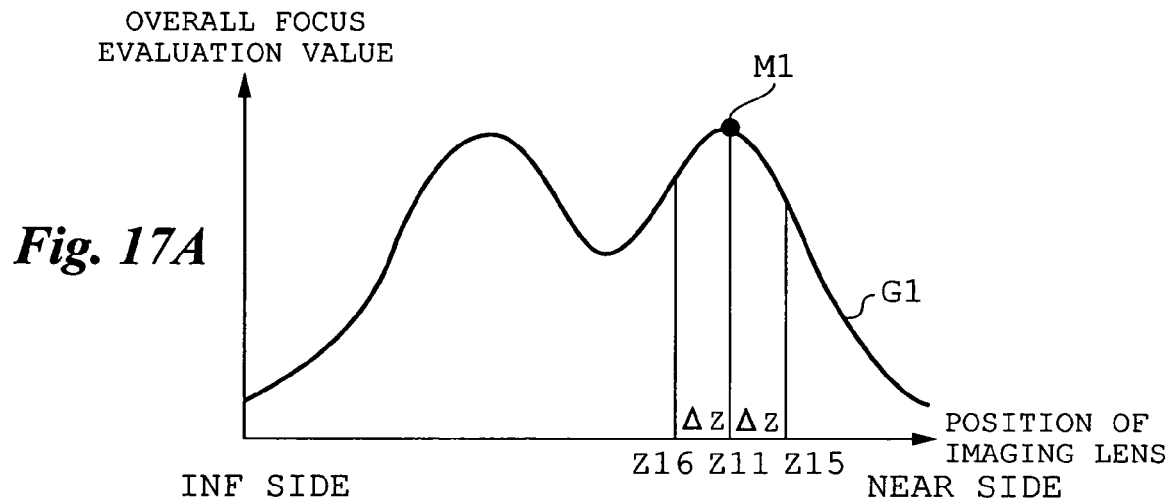
FIG. 17A illustrates the relationship between the position of an imaging lens and an overall focus evaluation value.
Figure 17B:
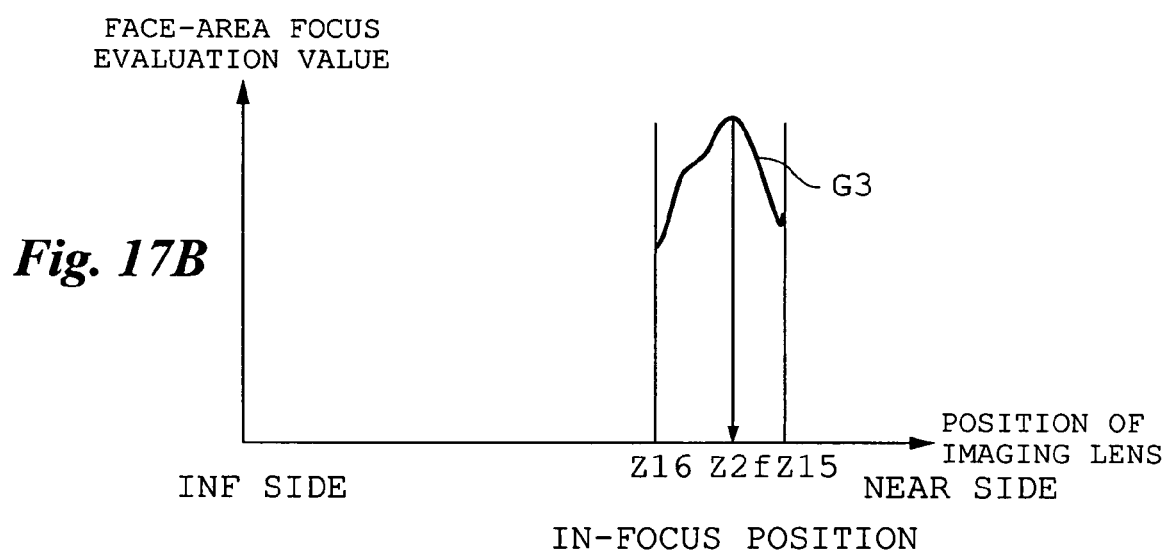
FIG. 17B illustrates the relationship between the position of an imaging lens and a face-area focus evaluation value in a further embodiment.

FIGS. 17A and 17B illustrate a further embodiment of the present invention.

In FIGS. 16A to 16C described above, the range decided upon as the focusing range is one defined by points of intersection between the graph G1 and the overall focus integration value p2 obtained when the overall focus evaluation value p1 at the maximal value M1 is lowered a prescribed level q. In FIGS. 17A and 17B, however, the range decided upon as the focusing range is a range Z15 to Z16 defined by positions Z15, and Z16 obtained when the imaging lens 8 is moved by ΔZ from the imaging-lens position Z11, which corresponds to the maximal value M1, toward the NEAR side and toward the INF side, as illustrated in FIG. 17B.

If the focusing range is decided, then, as shown in FIG. 17B, a main search is conducted in this focusing range and a graph G3 is obtained in the same manner as illustrated in FIG. 16C. An in-focus position Z2f of the imaging lens 8 is decided from the graph G3 obtained.

In the embodiment described above, the imaging lens is set at an initial position on the NEAR side to obtain the focus evaluation value, then the imaging lens is moved to the next position to obtain the focus evaluation value again. However, it may be so arranged that the imaging lens is set at an initial position on the INF (infinity) side to obtain the focus evaluation value and is then moved to the next position to obtain the focus evaluation value again. It may be so arranged that whether the initial position of the imaging lens is on the NEAR side or INF side is set in advance, or it may be so arranged that the user is capable of making this setting. If the arrangement is such that the user can make the setting, then the operating device 5 of the above-described digital still camera would be provided with a setting device such as a button or switch to set the NEAR side or INF side. The signal resulting from the setting is applied to the control circuit 1, whereby the initial position of the imaging lens 8 is set to the NEAR side or INF side.

Furthermore, it may be so arranged that in a case where a short-distance image sensing mode such as a portrait shooting mode or macro shooting mode or a long-distance image sensing mode such as a scene shooting mode or night-scene shooting mode can be set as the shooting mode of the digital still camera, the initial position of the imaging lens 8 is set in accordance with the shooting mode. For example, in a case where the short-distance image sensing mode has been set, it can be construed that the main subject is at a location close to the digital still camera and therefore the imaging lens 8 is set at an initial position on the NEAR side. In a case where the long-distance image sensing mode has been set, it can be construed that the main subject is at a location far from the digital still camera and therefore the imaging lens 8 is set at an initial position on the INF side. Thus, the time it takes to detect the main subject in accordance with movement of the imaging lens is shortened in conformity with each image sensing mode.

Furthermore, in a case where the imaging lens 8 is a zoom lens, the initial position of the imaging lens (zoom lens) 8 may be set to the NEAR side or INF side in dependence upon the zoom magnification of the zoom lens. For example, in a case where zoom magnification of the zoom lens is set high (on the telephoto side), it can be construed that the main subject is far away and therefore the initial position is placed on the INF side. In a case where zoom magnification of the zoom lens is set low (on the close-up side), it can be construed that the main subject is near and therefore the initial position is placed on the NEAR side. Of course, this does not mean that the initial position must necessarily be placed on the INF side if the zoom magnification of the zoom lens is high and that it must necessarily be placed on the NEAR side if the zoom magnification of the zoom lens is low. The initial position may conversely be placed on the INF side if the magnification of the zoom lens is low and on the NEAR side if the zoom magnification is high.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for deciding an in-focus position of an imaging lens, comprising:
a solid-state electronic image sensing device for sensing the image of a subject and outputting image data representing the image of the subject;
a first focusing data output device for moving an imaging lens, which has been placed in front of said solid-state electronic image sensing device, along the direction of the optic axis in increments of a first prescribed distance and outputting focusing data representing degree of focus of the image of the subject at every position to which the lens is moved;
a target detecting device for detecting a target, which is contained in the image of the subject represented by image data that is output from said solid-state electronic image sensing device at least at one position among positions of the imaging lens at which the level of the focusing data that has been output from said first focusing data output device is equal to or greater than a prescribed threshold value, in increments of a second prescribed distance that is less than the first prescribed distance; and
an in-focus position deciding device for deciding on the position of the imaging lens as the in-focus position based upon data that corresponds to the target detected by said target detecting device.

2. The apparatus according to claim 1, further comprising:
a focusing target area deciding device for deciding one or a plurality of focusing target areas based upon the target detected by said target detecting device; and
a weighting coefficient deciding device for deciding a weighting coefficient in such a manner that a weighting coefficient of the target is enlarged in the one or plurality of focusing target areas decided by said focusing target area deciding device;
wherein said in-focus position deciding device decides on the position of the imaging lens as the in-focus position based upon data corresponding to the focusing target area decided by said focusing target area deciding device.

3. The apparatus according to claim 1, wherein the target is a face or eye.

4. An apparatus for deciding an in-focus position of an imaging lens, comprising:
a solid-state electronic image sensing device for sensing the image of a subject and outputting image data representing the image of the subject;
a first focusing data output device for moving an imaging lens, which has been placed in front of said solid-state electronic image sensing device, along the direction of the optic axis in increments of a first prescribed distance and outputting first focusing data representing degree of focus of the image of the subject at every position to which the lens is moved;
a target determination device for determining whether a target is contained in the image of the subject represented by image data that is output from said solid-state electronic image sensing device at least at one position among positions of the imaging lens at which the level of the first focusing data that has been output from said first focusing data output device is equal to or greater than a prescribed threshold value;

a focusing range deciding device for deciding a focusing range, which contains the position of the imaging lens prevailing when said target determination device has determined that the target is contained in the image of the subject, among ranges in which the imaging lens is situated in such a manner that the level of the first focusing data that has been output from said first focusing data output device is equal to or greater than a threshold value continuously;

a second focusing data output device for moving the imaging lens along the direction of the optic axis in increments of a second prescribed distance, which is less than the first prescribed distance, in the focusing range that has been decided by said focusing range deciding device, and outputting second focusing data representing degree of focus of the image of the subject at every position to which the lens is moved; and an in-focus position deciding device for deciding on the position of the imaging lens, at which the image of the subject is brought into focus based upon the second focusing data that has been output from said second focusing data output device, as the in-focus position.

5. The apparatus according to claim 4, wherein said target determination device detects and determines, in increments of a third prescribed distance that is less than the first prescribed distance, the image of the target contained in the image of the subject represented by image data that is output from said solid-state electronic image sensing device at a position of the imaging lens at which the level of the first focusing data that has been output from said first focusing data output device is equal to or greater than the prescribed threshold value; and said second focusing data output device moves the imaging lens along the direction of the optic axis again within the focusing range that has been decided by said focusing range deciding device and outputs the second focusing data, which represents the degree of focus of the image of the target detected by said target determination device among images of the subject, at every position to which the lens is moved.

6. The apparatus according to claim 5, wherein said second focusing data output device moves the imaging lens along the direction of the optic axis in the focusing range that has been decided by said focusing range deciding device, and outputs the second focusing data, which represents the degree of focus of the image within the target-image area decided based upon all targets that have been detected by said target determination device among images of the subject, at every position to which the lens is moved.

7. The apparatus according to claim 6, further comprising:
a sub-target area deciding device for deciding one or a plurality of sub-target areas based upon all of the targets; and
a weighting coefficient deciding device for deciding a weighting coefficient in such a manner that a weighting coefficient of the target area is enlarged in the one or plurality of sub-target areas decided by said sub-target area deciding device;
wherein said second focusing data output device moves the imaging lens again along the direction of the optic axis within the focusing range that has been decided by said focusing range deciding device and outputs the second focusing data, which represents the degree of focus of the target detected by said target determination device among images of the subject, at every position to which the lens is moved while adjusting the level of the second focusing data based upon the weighting coefficient that has been decided by said weighting coefficient deciding device.

8. The apparatus according to claim 6, further comprising:
a display device for displaying the image of the subject, which is represented by the image data that has been output from said solid-state electronic image sensing device, on a display screen; and
a display control device for controlling said display device so as to display the target image area on the image of the subject.

9. The apparatus according to claim 3, wherein detection of the target image is performed based upon at least one among target likeliness in the target image area, size of the target, brightness of the target and position of the target area.

10. The apparatus according to claim 3, further comprising:
a display device for displaying the image of the subject, which is represented by the image data that has been output from said solid-state electronic image sensing device, on a display screen; and
a display control device for controlling said display device so as to display the area of the detected target image on the image of the subject.

11. The apparatus according to claim 4, wherein movement of the imaging lens in said first focusing data output device is performed from a NEAR side; and
said target determination device executes processing to determine whether the image of the subject in said subject determination device contains a target whenever the imaging lens is moved;
said apparatus further comprising an imaging-lens movement control device for controlling said first focusing data output device so as to halt movement of the imaging lens in response to detection of the target image.

12. The apparatus according to claim 4, wherein movement of the imaging lens in said first focusing data output device is performed from an INF side.

13. The apparatus according to claim 4, wherein movement of the imaging lens in said first focusing data output device is performed from a NEAR side or an INF side in accordance with a setting.

14. The apparatus according to claim 13, further comprising a setting device for setting direction of movement of the imaging lens in said first focusing data output device;
wherein movement of the imaging lens in said first focusing data output device is performed from the NEAR side or INF side in accordance with the setting made by said setting device.

15. The apparatus according to claim 13, further comprising:
an image sensing mode determination device for determining whether a short-distance image sensing mode or a long-distance image sensing mode has been set; and
a device for setting movement of the imaging lens in said first focusing data output device in such a manner that movement is performed from the NEAR side in response to a determination by said image sensing mode determination device that the short-distance image sensing mode has been set and from the INF side in response to a determination by said image sensing mode determination device that the long-distance image sensing mode has been set.

16. The apparatus according to claim 13, wherein the imaging lens is a zoom lens; and movement of the imaging lens in said first focusing data output device is performed from the NEAR side or INF side in accordance with zoom magnification of said zoom lens.

17. The apparatus according to claim 13, wherein said target determination device determines whether the image of the subject represented by the image data that is output from said solid-state electronic image sensing device contains the image of a target at a position of the imaging lens that corresponds to a first maximal value equal to or greater than the prescribed threshold value in the first focusing data that has been output from said first focusing data output device.

18. The apparatus according to claim 4, wherein distance travelled by the imaging lens in said first focusing data output device is greater than distance travelled by the imaging lens in said second focusing data output device.

19. A method of deciding an in-focus position of an imaging lens, comprising the steps of:

sensing the image of a subject using a solid-state electronic image sensing device and obtaining image data representing the image of the subject;

moving an imaging lens, which has been placed in front of the solid-state electronic image sensing device, along the direction of the optic axis in increments of a first prescribed distance and obtaining focusing data representing degree of focus of the image of the subject at every position to which the lens is moved;

detecting the image of a target, which is contained in the image of the subject represented by image data that is obtained from the solid-state electronic image sensing device at least at one position among positions of the imaging lens at which the level of the focusing data obtained is equal to or greater than a prescribed threshold value, in increments of a second prescribed distance that is less than the first prescribed distance; and deciding on the position of the imaging lens as the in-focus position based upon data that corresponds to the target detected.

20. A method of deciding an in-focus position of an imaging lens, comprising the steps of:

sensing the image of a subject using a solid-state electronic image sensing device and obtaining image data representing the image of the subject;

moving an imaging lens, which has been placed in front of the solid-state electronic image sensing device, along the direction of the optic axis in increments of a first prescribed distance and obtaining first focusing data representing degree of focus of the image of the subject at every position to which the lens is moved;

determining whether the image of a target is contained in the image of the subject represented by image data that is obtained from the solid-state electronic image sensing device at least at one position among positions of the imaging lens at which the level of the first focusing data obtained is equal to or greater than a prescribed threshold value;

deciding a focusing range, which contains the position of the imaging lens prevailing when it has been determined that the target is contained in the image of the subject, among ranges in which the imaging lens is situated in such a manner, that the level of the first focusing data obtained will be equal to or greater than a threshold value continuously;

moving the imaging lens along the direction of the optic axis in increments of a second prescribed distance, which is less than the first prescribed distance, in the focusing range decided, and obtaining second focusing data representing degree of focus of the image of the subject at every position to which the lens is moved; and deciding on the position of the imaging lens, at which the image of the subject is brought into focus based upon the second focusing data, as the in-focus position.

\* \* \* \* \*